(12) United States Patent
Cherian et al.

(10) Patent No.: US 8,099,504 B2
(45) Date of Patent: Jan. 17, 2012

(54) PRESERVING SESSIONS IN A WIRELESS NETWORK

(75) Inventors: Sanjay Cherian, Brookline, NH (US);
Dennis Ng, Northboro, MA (US);
Arthur J. Barabell, Sudbury, MA (US);
Suresh Ramaswamy, Chelmsford, MA (US); Deepak Garg, Nashua, NH (US)

(73) Assignee: Airvana Network Solutions, Inc., Chelmsford, MA (US)

( * ) Notice: Subject to any disclaimer, the term of this patent is extended or adjusted under 35 U.S.C. 154(b) by 783 days.

(21) Appl. No.: 11/166,893

(22) Filed: Jun. 24, 2005

(65) Prior Publication Data
US 2006/0294241 A1    Dec. 28, 2006

(51) Int. Cl.
| G06F 15/173 | (2006.01) |
| G06F 15/177 | (2006.01) |
| G06F 15/16 | (2006.01) |
| G06F 11/00 | (2006.01) |
| G01R 31/08 | (2006.01) |
| G08C 15/00 | (2006.01) |
| H04J 1/16 | (2006.01) |
| H04J 3/14 | (2006.01) |
| H04L 1/00 | (2006.01) |
| H04L 12/26 | (2006.01) |
| H04M 7/00 | (2006.01) |

(52) U.S. Cl. ........ 709/227; 709/220; 709/223; 709/224; 709/228; 709/239; 370/216; 370/252; 379/221.01; 379/221.04

(58) Field of Classification Search .................. 709/227, 709/228, 239, 223

See application file for complete search history.

(56) References Cited

U.S. PATENT DOCUMENTS

| 5,128,938 A | 7/1992 | Borras |
| 5,239,675 A | 8/1993 | Dudczak |
| 5,377,224 A | 12/1994 | Hudson |
| 5,574,996 A | 11/1996 | Raith |
| 5,754,945 A | 5/1998 | Lin et al. |
| 5,790,528 A | 8/1998 | Muszynski |
| 5,815,813 A | 9/1998 | Faruque |
| 5,828,661 A | 10/1998 | Weaver et al. |
| 5,852,630 A | 12/1998 | Langberg et al. |
| 5,857,154 A | 1/1999 | Laborde et al. |
| 5,884,177 A | 3/1999 | Hanley |
| 5,930,714 A | 7/1999 | Abu-Amara et al. |

(Continued)

FOREIGN PATENT DOCUMENTS

AU    1998/72855    12/1998

(Continued)

OTHER PUBLICATIONS

Search Report and Written Opinion mailed Jan. 29, 2008 in counterpart International application No. PCT/US2006/25018 (11 pages).

(Continued)

Primary Examiner — Kevin Bates
Assistant Examiner — Tom Y Chang
(74) Attorney, Agent, or Firm — Fish & Richardson P.C.

(57) ABSTRACT

A radio network controller and methods for reestablishing sessions in a wireless network are described. At least a portion of session information associated with a first session is saved; and in response to detecting an unexpected degradation of the first session, reestablishment of the first session is triggered using the portion of the session information.

45 Claims, 15 Drawing Sheets

U.S. PATENT DOCUMENTS

| | | | |
|---|---|---|---|
| 5,937,345 A | 8/1999 | McGowan et al. |
| 5,940,762 A | 8/1999 | Lee et al. |
| 5,960,349 A | 9/1999 | Chheda |
| 5,974,318 A | 10/1999 | Satarasinghe |
| 5,983,282 A | 11/1999 | Yucebay |
| 5,991,635 A | 11/1999 | Dent et al. |
| 6,011,970 A | 1/2000 | McCarthy |
| 6,014,564 A | 1/2000 | Donis et al. |
| 6,016,429 A | 1/2000 | Khafizov et al. |
| 6,023,625 A | 2/2000 | Myers |
| 6,032,033 A | 2/2000 | Morris et al. |
| 6,047,186 A | 4/2000 | Yu et al. |
| 6,049,715 A | 4/2000 | Willhoff et al. |
| 6,052,594 A * | 4/2000 | Chuang et al. ................ 455/450 |
| 6,061,560 A | 5/2000 | Saboorian et al. |
| 6,069,871 A | 5/2000 | Sharma et al. |
| 6,091,953 A | 7/2000 | Ho et al. |
| 6,101,394 A | 8/2000 | Illidge |
| 6,111,857 A | 8/2000 | Soliman et al. |
| 6,112,089 A | 8/2000 | Satarasinghe |
| 6,119,024 A | 9/2000 | Takayama |
| 6,122,513 A | 9/2000 | Bassirat |
| 6,151,512 A | 11/2000 | Chheda et al. |
| 6,167,036 A | 12/2000 | Beven |
| 6,178,328 B1 | 1/2001 | Tang et al. |
| 6,192,246 B1 | 2/2001 | Satarasinghe |
| 6,198,719 B1 | 3/2001 | Faruque et al. |
| 6,198,910 B1 | 3/2001 | Hanley |
| 6,208,615 B1 | 3/2001 | Faruque et al. |
| 6,219,539 B1 | 4/2001 | Basu et al. |
| 6,223,047 B1 | 4/2001 | Ericsson |
| 6,233,247 B1 | 5/2001 | Alami et al. |
| 6,252,862 B1 | 6/2001 | Sauer et al. |
| 6,256,300 B1 | 7/2001 | Ahmed et al. |
| 6,266,529 B1 | 7/2001 | Chheda |
| 6,272,148 B1 | 8/2001 | Takagi et al. |
| 6,285,875 B1 | 9/2001 | Alajoki et al. |
| 6,289,220 B1 | 9/2001 | Spear |
| 6,320,898 B1 | 11/2001 | Newson et al. |
| 6,345,185 B1 | 2/2002 | Yoon et al. |
| 6,366,961 B1 | 4/2002 | Subbiah et al. |
| 6,370,357 B1 | 4/2002 | Xiao et al. |
| 6,370,381 B1 | 4/2002 | Minnick et al. |
| 6,393,482 B1 | 5/2002 | Rai et al. |
| 6,400,712 B1 | 6/2002 | Phillips |
| 6,404,754 B1 | 6/2002 | Lim |
| 6,408,182 B1 | 6/2002 | Davidson et al. |
| 6,418,306 B1 | 7/2002 | McConnell |
| 6,424,834 B1 | 7/2002 | Chang et al. |
| 6,430,168 B1 | 8/2002 | Djurkovic et al. |
| 6,438,376 B1 | 8/2002 | Elliott et al. |
| 6,438,377 B1 * | 8/2002 | Savolainen ................ 455/439 |
| 6,445,922 B1 | 9/2002 | Hiller et al. |
| 6,459,696 B1 | 10/2002 | Carpenter et al. |
| 6,473,399 B1 | 10/2002 | Johansson et al. |
| 6,477,159 B1 | 11/2002 | Yahagi |
| 6,480,476 B1 | 11/2002 | Willars |
| 6,480,718 B1 | 11/2002 | Tse |
| 6,507,741 B1 | 1/2003 | Bassirat |
| 6,522,885 B1 | 2/2003 | Tang et al. |
| 6,539,030 B1 | 3/2003 | Bender et al. |
| 6,542,481 B2 * | 4/2003 | Foore et al. .................. 370/329 |
| 6,542,752 B1 | 4/2003 | Illidge |
| 6,545,984 B1 | 4/2003 | Simmons |
| 6,560,453 B1 | 5/2003 | Henry et al. |
| 6,580,699 B1 | 6/2003 | Manning et al. |
| 6,590,879 B1 | 7/2003 | Huang et al. |
| 6,611,695 B1 | 8/2003 | Periyalwar |
| 6,618,585 B1 | 9/2003 | Robinson et al. |
| 6,621,811 B1 | 9/2003 | Chang et al. |
| 6,628,637 B1 | 9/2003 | Li et al. |
| 6,651,105 B1 * | 11/2003 | Bhagwat et al. ............. 709/239 |
| 6,687,237 B1 | 2/2004 | Lee et al. |
| 6,701,148 B1 | 3/2004 | Carter et al. |
| 6,701,149 B1 | 3/2004 | Bagchi et al. |
| 6,711,144 B1 | 3/2004 | Kim et al. |
| 6,731,618 B1 | 5/2004 | Chung et al. |
| 6,738,625 B1 | 5/2004 | Oom et al. |
| 6,741,862 B2 | 5/2004 | Chung et al. |
| 6,754,191 B1 | 6/2004 | Paranchych et al. |
| 6,757,319 B1 | 6/2004 | Parsa et al. |
| 6,768,903 B2 | 7/2004 | Fauconnier et al. |
| 6,771,962 B2 | 8/2004 | Saifullah et al. |
| 6,781,999 B2 | 8/2004 | Eyuboglu et al. |
| 6,813,498 B1 * | 11/2004 | Durga et al. ................ 455/456.1 |
| 6,826,402 B1 | 11/2004 | Tran |
| 6,834,050 B1 | 12/2004 | Madour et al. |
| 6,842,630 B2 | 1/2005 | Periyalwar |
| 6,847,821 B1 | 1/2005 | Lewis et al. |
| 6,877,104 B1 * | 4/2005 | Shimono ......................... 714/4 |
| 6,909,887 B2 | 6/2005 | Fauconnier et al. |
| 6,944,452 B2 | 9/2005 | Coskun et al. |
| 6,975,869 B1 | 12/2005 | Billon |
| 6,996,056 B2 | 2/2006 | Chheda et al. |
| 6,999,784 B1 | 2/2006 | Choi et al. |
| 7,035,636 B1 | 4/2006 | Lim et al. |
| 7,042,858 B1 | 5/2006 | Jia et al. |
| 7,047,009 B2 | 5/2006 | Laroia et al. |
| 7,072,663 B2 | 7/2006 | Ramos et al. |
| 7,079,511 B2 | 7/2006 | Abrol et al. |
| 7,085,251 B2 | 8/2006 | Rezaiifar |
| 7,110,785 B1 | 9/2006 | Paranchych et al. |
| 7,130,626 B2 | 10/2006 | Bender et al. |
| 7,130,668 B2 | 10/2006 | Chang et al. |
| 7,139,575 B1 | 11/2006 | Chen et al. |
| 7,162,247 B2 | 1/2007 | Baba et al. |
| 7,170,871 B2 | 1/2007 | Eyuboglu et al. |
| 7,177,650 B1 | 2/2007 | Reiger et al. |
| 7,200,391 B2 | 4/2007 | Chung et al. |
| 7,212,822 B1 | 5/2007 | Vicharelli et al. |
| 7,236,764 B2 | 6/2007 | Zhang et al. |
| 7,242,958 B2 | 7/2007 | Chung et al. |
| 7,251,491 B2 | 7/2007 | Jha |
| 7,277,446 B1 | 10/2007 | Abi-Nassif et al. |
| 7,298,327 B2 | 11/2007 | Dupray et al. |
| 7,299,168 B2 | 11/2007 | Rappaport et al. |
| 7,299,278 B2 | 11/2007 | Ch'ng |
| 7,349,699 B1 | 3/2008 | Kelly et al. |
| 7,398,087 B1 | 7/2008 | McConnell et al. |
| 7,408,887 B2 | 8/2008 | Sengupta et al. |
| 7,408,901 B1 | 8/2008 | Narayanabhatla |
| 7,411,996 B2 | 8/2008 | Kim et al. |
| 7,453,912 B2 | 11/2008 | Laroia et al. |
| 7,457,265 B2 | 11/2008 | Julka et al. |
| 7,486,696 B2 | 2/2009 | Garg et al. |
| 7,512,110 B2 | 3/2009 | Sayeedi et al. |
| 7,546,124 B1 | 6/2009 | Tenneti et al. |
| 7,751,835 B2 | 7/2010 | Sharma et al. |
| 7,751,858 B2 * | 7/2010 | Chou ............................ 455/574 |
| 2002/0025820 A1 | 2/2002 | Fauconnier et al. |
| 2002/0031107 A1 | 3/2002 | Li et al. |
| 2002/0032034 A1 | 3/2002 | Tiedemann et al. |
| 2002/0035699 A1 * | 3/2002 | Crosbie ......................... 713/201 |
| 2002/0104399 A1 | 3/2002 | Ma et al. |
| 2002/0067707 A1 | 6/2002 | Morales et al. |
| 2002/0068570 A1 | 6/2002 | Abrol et al. |
| 2002/0082018 A1 | 6/2002 | Coskun |
| 2002/0085719 A1 * | 7/2002 | Crosbie ......................... 380/248 |
| 2002/0102976 A1 | 8/2002 | Newbury et al. |
| 2002/0136226 A1 * | 9/2002 | Christoffel et al. ........... 370/401 |
| 2002/0145990 A1 | 10/2002 | Sayeedi |
| 2002/0193110 A1 | 12/2002 | Julka et al. |
| 2002/0196749 A1 | 12/2002 | Eyuboglu et al. |
| 2003/0003913 A1 | 1/2003 | Chen et al. |
| 2003/0026240 A1 * | 2/2003 | Eyuboglu et al. ............. 370/349 |
| 2003/0031201 A1 | 2/2003 | Choi |
| 2003/0067970 A1 | 4/2003 | Kim et al. |
| 2003/0095513 A1 | 5/2003 | Woodmansee et al. |
| 2003/0100311 A1 | 5/2003 | Chung et al. |
| 2003/0114162 A1 | 6/2003 | Chheda et al. |
| 2003/0117948 A1 * | 6/2003 | Ton et al. ...................... 370/218 |
| 2003/0125039 A1 | 7/2003 | Lachtar et al. |
| 2003/0195016 A1 | 10/2003 | Periyalwar |
| 2004/0008649 A1 * | 1/2004 | Wybenga et al. ............. 370/338 |
| 2004/0015607 A1 | 1/2004 | Bender et al. |
| 2004/0038700 A1 * | 2/2004 | Gibbs ........................... 455/522 |
| 2004/0068668 A1 * | 4/2004 | Lor et al. ...................... 713/201 |

| | | |
|---|---|---|
| 2004/0081111 A1* | 4/2004 | Bae et al. .................. 370/316 |
| 2004/0179492 A1 | 9/2004 | Zhang et al. |
| 2004/0203771 A1* | 10/2004 | Chang et al. ............... 455/435.1 |
| 2004/0214574 A1 | 10/2004 | Eyuboglu et al. |
| 2004/0218556 A1 | 11/2004 | Son et al. |
| 2004/0224687 A1 | 11/2004 | Rajkotia |
| 2005/0021616 A1* | 1/2005 | Rajahalme et al. .......... 709/204 |
| 2005/0025116 A1 | 2/2005 | Chen et al. |
| 2005/0053034 A1 | 3/2005 | Chiueh |
| 2005/0111429 A1 | 5/2005 | Kim et al. |
| 2005/0113117 A1 | 5/2005 | Bolin et al. |
| 2005/0124343 A1 | 6/2005 | Kubo |
| 2005/0148297 A1 | 7/2005 | Lu et al. |
| 2005/0181795 A1 | 8/2005 | Mark et al. |
| 2005/0207368 A1 | 9/2005 | Nam |
| 2005/0213555 A1 | 9/2005 | Eyuboglu et al. |
| 2005/0233746 A1 | 10/2005 | Laroia et al. |
| 2005/0243749 A1 | 11/2005 | Mehrabanzad et al. |
| 2005/0245279 A1 | 11/2005 | Mehrabanzad et al. |
| 2006/0030323 A1 | 2/2006 | Ode et al. |
| 2006/0067422 A1 | 3/2006 | Chung |
| 2006/0067451 A1 | 3/2006 | Pollman et al. |
| 2006/0126509 A1 | 6/2006 | Abi-Nassif |
| 2006/0126554 A1 | 6/2006 | Motegi et al. |
| 2006/0126556 A1 | 6/2006 | Jiang et al. |
| 2006/0148460 A1* | 7/2006 | Mukherjee et al. .......... 455/417 |
| 2006/0159045 A1 | 7/2006 | Ananthaiyer et al. |
| 2006/0182063 A1 | 8/2006 | Ma et al. |
| 2006/0183497 A1 | 8/2006 | Paranchych et al. |
| 2006/0203766 A1 | 9/2006 | Kim et al. |
| 2006/0209760 A1 | 9/2006 | Saito et al. |
| 2006/0209882 A1 | 9/2006 | Han et al. |
| 2006/0240782 A1 | 10/2006 | Pollman et al. |
| 2006/0259628 A1 | 11/2006 | Vadlapudi et al. |
| 2006/0264218 A1 | 11/2006 | Zhang et al. |
| 2006/0291420 A1 | 12/2006 | Ng |
| 2006/0294214 A1 | 12/2006 | Chou |
| 2006/0294241 A1 | 12/2006 | Cherian et al. |
| 2007/0022396 A1 | 1/2007 | Attar et al. |
| 2007/0026884 A1 | 2/2007 | Rao |
| 2007/0058628 A1 | 3/2007 | Rao et al. |
| 2007/0077948 A1 | 4/2007 | Sharma et al. |
| 2007/0097916 A1 | 5/2007 | Eyuboglu et al. |
| 2007/0099632 A1 | 5/2007 | Choksi |
| 2007/0105527 A1 | 5/2007 | Nylander |
| 2007/0115896 A1 | 5/2007 | To et al. |
| 2007/0140172 A1 | 6/2007 | Garg et al. |
| 2007/0140184 A1 | 6/2007 | Garg et al. |
| 2007/0140185 A1 | 6/2007 | Garg et al. |
| 2007/0140218 A1 | 6/2007 | Nair et al. |
| 2007/0153750 A1 | 7/2007 | Baglin et al. |
| 2007/0155329 A1 | 7/2007 | Mehrabanzad et al. |
| 2007/0160008 A1 | 7/2007 | Burgess |
| 2007/0197220 A1 | 8/2007 | Willey |
| 2007/0220573 A1 | 9/2007 | Chiussi et al. |
| 2007/0230419 A1 | 10/2007 | Raman et al. |
| 2007/0238442 A1 | 10/2007 | Mate et al. |
| 2007/0238476 A1 | 10/2007 | Raman et al. |
| 2007/0242648 A1 | 10/2007 | Garg et al. |
| 2007/0248042 A1 | 10/2007 | Harikumar et al. |
| 2008/0003988 A1 | 1/2008 | Richardson |
| 2008/0009328 A1 | 1/2008 | Narasimha |
| 2008/0013488 A1 | 1/2008 | Garg et al. |
| 2008/0062925 A1 | 3/2008 | Mate et al. |
| 2008/0065752 A1 | 3/2008 | Ch'ng et al. |
| 2008/0069020 A1 | 3/2008 | Richardson |
| 2008/0069028 A1 | 3/2008 | Richardson |
| 2008/0070574 A1* | 3/2008 | Vikberg et al. ............ 455/435.2 |
| 2008/0076398 A1 | 3/2008 | Mate et al. |
| 2008/0117842 A1 | 5/2008 | Rao |
| 2008/0119172 A1 | 5/2008 | Rao et al. |
| 2008/0120417 A1 | 5/2008 | Harikumar et al. |
| 2008/0139203 A1 | 6/2008 | Ng et al. |
| 2008/0146232 A1 | 6/2008 | Knisely |
| 2008/0151843 A1 | 6/2008 | Valmikam et al. |
| 2008/0159236 A1 | 7/2008 | Ch'ng et al. |
| 2008/0162924 A1 | 7/2008 | Chinitz et al. |
| 2008/0162926 A1 | 7/2008 | Xiong et al. |
| 2008/0253550 A1 | 10/2008 | Ch'ng et al. |
| 2008/0254792 A1 | 10/2008 | Ch'ng |
| 2008/0273493 A1 | 11/2008 | Fong |
| 2008/0287130 A1 | 11/2008 | Laroia et al. |
| 2009/0034440 A1 | 2/2009 | Samar et al. |
| 2009/0082020 A1 | 3/2009 | Ch'ng et al. |
| 2009/0088155 A1 | 4/2009 | Kim |
| 2009/0103494 A1 | 4/2009 | Ma et al. |
| 2009/0116445 A1 | 5/2009 | Samar et al. |
| 2009/0129334 A1 | 5/2009 | Ma et al. |

FOREIGN PATENT DOCUMENTS

| | | |
|---|---|---|
| AU | 1998/84574 | 2/1999 |
| AU | 2001/21976 | 6/2001 |
| AU | 735575 | 7/2001 |
| AU | 2003/202721 | 10/2003 |
| CA | 2295922 | 3/2004 |
| CN | 1265253 | 8/2000 |
| CN | 1653844 | 10/2004 |
| CN | 101015224 A | 8/2007 |
| EP | 625863 | 11/1994 |
| EP | 0904369 | 3/1999 |
| EP | 983694 | 3/2000 |
| EP | 983705 | 3/2000 |
| EP | 995278 | 4/2000 |
| EP | 995296 | 4/2000 |
| EP | 1005245 | 5/2000 |
| EP | 1011283 | 6/2000 |
| EP | 1014107 | 6/2000 |
| EP | 1397929 | 3/2004 |
| EP | 1491065 | 12/2004 |
| EP | 1751998 | 2/2007 |
| EP | 1896980 | 3/2008 |
| EP | 1897383 | 3/2008 |
| GB | 2447585 | 8/2008 |
| GB | 2452688 | 3/2009 |
| GB | 2447585 | 10/2010 |
| HK | 1101334 A | 10/2007 |
| JP | 2007-538476 | 12/2007 |
| JP | 2008-547329 | 12/2008 |
| JP | 2008-547358 | 12/2008 |
| KR | 9833373 | 8/1998 |
| KR | 2004/046069 | 6/2004 |
| KR | 2004/089744 | 10/2004 |
| KR | 787289 | 12/2007 |
| MX | 1999/10613 | 3/2002 |
| WO | WO9748191 | 12/1997 |
| WO | WO 98/08353 | 2/1998 |
| WO | WO 98/09460 | 3/1998 |
| WO | WO98/53618 | 11/1998 |
| WO | WO98/53620 | 11/1998 |
| WO | WO99/03245 | 1/1999 |
| WO | WO99/04511 | 1/1999 |
| WO | WO00/60891 | 10/2000 |
| WO | WO01/45308 | 6/2001 |
| WO | WO02/071633 | 9/2002 |
| WO | WO02/071652 | 9/2002 |
| WO | WO03/001820 | 1/2003 |
| WO | WO03/009576 | 1/2003 |
| WO | WO03/081938 | 10/2003 |
| WO | WO2004/064434 | 7/2004 |
| WO | WO2005/012520 | 12/2005 |
| WO | WO2005/115026 | 12/2005 |
| WO | WO2006/081527 | 8/2006 |
| WO | WO2007/002659 | 1/2007 |
| WO | WO2007/028122 | 3/2007 |
| WO | WO2007/028252 | 3/2007 |
| WO | WO2007/044099 | 4/2007 |
| WO | WO2007/045101 | 4/2007 |
| WO | WO 2007/075446 | 7/2007 |
| WO | WO2007/078766 | 7/2007 |
| WO | WO 2007/078766 | 7/2007 |

OTHER PUBLICATIONS

3$^{rd}$ Generation Partnership Project "3GPP2", cdma2000 High Rate Packet Data Air Interface Specification, C.S0024-A, Version 4.0, Oct. 25, 2002.

3$^{rd}$ Generation Partnership Project "3GPP2", cdma2000 High Rate

Packet Data Air Interface Specification, C.S0024-A, Version 1.0, Mar. 2004.
International Search Report and Written Opinion for PCT international application No. PCT/US2006/024958, mailed Apr. 26, 2007 (12 pages).
International Search Report and Written Opinion for PCT international application No. PCT/US2005/017385, mailed Oct. 26, 2006 (22 pages).
International Search Report for PCT international application No. PCT/US2002/020380, mailed Oct. 29, 2002 (5 pages).
International Preliminary Report on Patentability for Application No. PCT/US2006/25018, Mar. 19, 2009 (8 pages).
International Preliminary Report on Patentability for Application No. PCT/US2005/017385, Dec. 7, 2006 (8 pages).
International Preliminary Report on Patentability for Application No. PCT/US2006/024958, Jan. 17, 2008 (7 pages).
EP Examination Report for Application No. 06785637.7, Feb. 6, 2008 (2 pages).
International Preliminary Report on Patentability for PCT international application No. PCT/US2006/047963, mailed Dec. 11, 2008 (5 pages).
International Search Report and Written Opinion for PCT international application No. PCT/US2006/047963, mailed Sep. 26, 2008 (9 pages).
U.S. Appl. No. 09/891,103, filed Jun. 25, 2001, including application as filed, and pending claims.
PCT application No. PCT/US2002/020380 filed on Jun. 25, 2002, with Publication No. WO2003/001820, including application as filed.
U.S. Appl. No. 10/848,597, filed May 18, 2004, now U.S. Patent No. 7,170,871, issued Jan. 30, 2007, including application as filed.
U.S. Appl. No. 11/640,619, filed Dec. 18, 2006, including application as filed, and pending claims.
PCT application No. PCT/US2005/17385 filed on May 17, 2005, with Publication No. WO2005/115026, including application as filed.
PCT application No. PCT/US2006/025018 filed on Jun. 26, 2006, with Publication No. WO2007/044099, including application as filed.
U.S. Appl. No. 11/037,896, filed Jan. 18, 2005, including application as filed, and pending claims.
U.S. Appl. No. 11/167,785, filed Jun. 27, 2005, including application as filed, and pending claims.
PCT application No. PCT/US2006/24958 filed on Jun. 27, 2006, with Publication No. WO2007/002659, including application as filed.
U.S. Appl. No. 11/243,405, filed Oct. 4, 2005, including application as filed, and pending claims.
U.S. Appl. No. 11/303,773, filed Dec. 16, 2005, including application as filed, and pending claims.
U.S. Appl. No. 11/305,286, filed Dec. 16, 2005, including application as filed, and pending claims.
PCT application No. PCT/US2006/47524 filed on Dec. 13, 2006, with Publication No. WO2007/078766, including application as filed.
U.S. Appl. No. 11/303,774, filed Dec. 16, 2005, including application as filed, and pending claims.
PCT application No. PCT/US2006/47963 filed on Dec. 15, 2006, with Publication No. WO2007/075446, including application as filed.
U.S. Appl. No. 11/402,744, filed Apr. 12, 2006, including application as filed, and pending claims.
U.S. Appl. No. 11/955,644, filed Dec. 13, 2007, including application as filed, and pending claims.
Paul Bender, et al., "CDMA/HDR: A Bandwidth-Efficient High-Speed Wireless Data Service for Nomadic Users", IEEE Communications Magazine, Jul. 2000.
Paul Bender & Ramin Rezalifar, "Draft Baseline Text for the 1xEV-DO Upper Layers (excluding Physical Layer)", 3GPP2, Aug. 17, 2000.
3GPP2, "3GPP2 Access Network Interfaces Interoperability Specification 2, Release A," Jun. 2000.
TIA/EIA/TSB-115, "Wireless IP Architecture Based on IETF Protocols", Jun. 6, 2000.

3GPP2, "Wireless IP Network Standard", 3rd Generation Partnership Project 2 (3GPP2), Version 1.0.0, Jul. 14, 2000.
Goran Janevski, "IP-Based Mobile Wireless Access Network Architecture", Nortel Networks—MWIF Contribution, Draft dated Sep. 7, 2000.
3rd Generation Partnership Project "3GPP2", cdma2000 High Rate Packet Data Interface Specification, C.S0024-A, version 2.0, Jul. 2005.
3rd Generation Partnership Project "3GPP2", cdma2000 High Rate Packet Data Interface Specification, C.S0024-B, version 1.0, Apr. 2006.
Rashid Attar et al., "Evolution of cdma2000 Cellular Networks: Multicarrier EV-DO", IEEE Communications Magazine, Mar. 2006. pp. 46-53.
Chinese Office action of Chinese application No. 200580024230.0 mailed Mar. 15, 2009 (13 pages).
EP Examination Report for Application No. 05750705.5, Jan. 9, 2007, 2 pages.
Office action and response history of U.S. Appl. No. 09/891,103 to May 27, 2009.
Office action and response history of U.S. Appl. No. 11/037,896 to May 27, 2009.
Office action and response history of U.S. Appl. No. 11/167,785 to May 27, 2009.
Office action and response history of U.S. Appl. No. 11/243,405 to May 27, 2009.
Office action and response history of U.S. Appl. No. 11/303,773 to May 27, 2009.
Office action and response history of U.S. Appl. No. 11/305,286 to Jun. 1, 2009.
Office action and response history of U.S. Appl. No. 11/303,774 to May 27, 2009.
Office action and response history of U.S. Appl. No. 11/402,744 to May 27, 2009.
Office action and response history of U.S. Appl. No. 11/955,644 to May 27, 2009.
International Search Report and Written Opinion for PCT international application No. PCT/US2006/047524, mailed May 26, 2009 (13 pages).
TIA/EIA/IS-2001, Interoperability Specification (IOS) for CDMA2000 Network Access Interfaces, Aug. 2001 (revised version of May 2000).
Office action of U.S. Appl. No. 11/303,774 dated Jun. 12, 2009.
GB Examination Report for Application No. 0811839.0, mailed Jan. 22, 2010 (2 pages).
Chinese Office action of Chinese application No. 200580024230.0 mailed Nov. 20, 2009 (4 pages).
3rd Generation Partnership Project 2 "3GPP2", "cdma2000 High Rate Packet Data Interface Specification", C.S0024, version 2, Oct. 27, 2000, see pp. 113-153.
3rd Generation Partnership Project 2 "3GPP2", "cdma2000 High Rate Packet Data Interface Specification", C.S0024-B, version 2, Mar. 2007, see pp. 307-401.
Library Search for Nortel and frequency handoff. Search results dated Aug. 28, 2009, see pp. 4, 7, 9, 11, 19, 25, 29, 32, 41, 45, 49, 52, 56-60, 65 and 70.
Chinese Office action Chinese application No. 200580024230.0 sent Nov. 20, 2009 with English translation (6 pages).
Chinese Office action response of Chinese application No. 200580024230.0 filed Feb. 5, 2010, along with instructions for response and associate recommendation (12 pages).
European Patent Office communication and response of European application No. 06836082.5 mailed Jun. 18, 2009 (21 pages).
Chinese Office action with English translation of Chinese application No. 200580024230.0 dated May 17, 2010 (6 pages).
Response filed May 21, 2010 to GB Examination Report for Application No. 0811839.0, dated Jan. 22, 2010 (12 pages).
GB Examination Report for Application No. 0811839.0, mailed Jun. 3, 2010 (3 pages).
USPTO Non-Final Office Action in U.S. Appl. No. 11/243,405, dated Jan. 30, 2008, 7 pages.
Fish & Richardson P.C., Amendment in Reply to Action dated Jan. 30, 2008 in U.S. Appl. No. 11/243,405, filed May 30, 2008, 9 pages.

USPTO Non-Final Office Action in U.S. Appl. No. 11/243,405, dated Jul. 10, 2008, 13 pages.
Fish & Richardson P.C., Reply to Action dated Jul. 10, 2008 in U.S. Appl. No. 11/243,405, filed Dec. 10, 2008, 8 pages.
USPTO Final Office Action in U.S. Appl. No. 11/243,405, dated Feb. 12, 2009, 14 pages.
Fish & Richardson P.C., Amendment in Reply to Action dated Jan. 12, 2009 in U.S. Appl. No. 11/243,405, filed Apr. 10, 2009, 14 pages.
USPTO Advisory Action in U.S. Appl. No. 11/243,405, dated Apr. 23, 2009, 3 pages.
USPTO Advisory Action in U.S. Appl. No. 11/243,405, dated May 13, 2009, 3 pages.
USPTO Non-Final Office Action in U.S. Appl. No. 11/243,405, dated Jun. 22, 2009, 11 pages.
Fish & Richardson P.C., Notice of Appeal and Pre-Appeal Brief Request for Review in U.S. Appl. No. 11/243,405, filed Sep. 22, 2009, 6 pages.
USPTO Notice of Panel Decision from Pre-Appeal Brief Review in U.S. Appl. No. 11/243,405, dated Oct. 22, 2009, 2 pages.
USPTO Interview Summary in U.S. Appl. No. 11/243,405, dated Nov. 5, 2009, 3 pages.
USPTO Notice of Allowance in U.S. Appl. No. 11/243,405, dated Jan. 6, 2010, 4 pages.
USPTO Non-Final Office Action in U.S. Appl. No. 11/303,773, dated Apr. 2, 2008, 11 pages.
Fish & Richardson P.C., Amendment in Reply to Action dated Apr. 2, 2008 in U.S. Appl. No. 11/303,773, filed Aug. 4, 2008, 19 pages.
USPTO Final Office Action in U.S. Appl. No. 11/303,773, dated Oct. 22, 2008, 14 pages.
Fish & Richardson P.C., Amendment in Reply to Action dated Oct. 22, 2008 in U.S. Appl. No. 11/303,773, filed Feb. 23, 2009, 16 pages.
USPTO Interview Summary in U.S. Appl. No. 11/303,773, dated Feb. 26, 2009, 2 pages.
USPTO Non-Final Office Action in U.S. Appl. No. 11/303,773, dated Mar. 13, 2009, 14 pages.
Fish & Richardson P.C., Reply to Action dated Mar. 13, 2009 in U.S. Appl. No. 11/303,773, filed Aug. 13, 2009, 22 pages.
USPTO Final Office Action in U.S. Appl. No. 11/303,773, dated Nov. 18, 2009, 14 pages.
Fish & Richardson P.C., Amendment in Reply to Action dated Nov. 18, 2009 in U.S. Appl. No. 11/303,773, filed Feb. 18, 2010, 22 pages.
USPTO Non-Final Office Action in U.S. Appl. No. 11/303,773, dated Mar. 11, 2010, 14 pages.
Fish & Richardson P.C., Reply to Action dated Mar. 11, 2010 in U.S. Appl. No. 11/303,773, filed Jun. 11, 2010, 23 pages.
USPTO Non-Final Office Action in U.S. Appl. No. 11/305,286, dated Oct. 8, 2008, 12 pages.
Fish & Richardson P.C., Amendment in Reply to Action dated Oct. 8, 2008 in U.S. Appl. No. 11/305,286, filed Feb. 27, 2009, 25 pages.
USPTO Final Office Action in U.S. Appl. No. 11/305,286, dated Jun. 1, 2009, 22 pages.
Fish & Richardson P.C., Amendment in Reply to Action dated Jun. 1, 2009 in U.S. Appl. No. 11/305,286, filed Sep. 30, 2009, 27 pages.
USPTO Non-Final Office Action in U.S. Appl. No. 11/305,286, dated Dec. 30, 2009, 27 pages.
Fish & Richardson P.C., Amendment in Reply to Action dated Dec. 30, 2009 in U.S. Appl. No. 11/305,286, filed Mar. 30, 2010, 31 pages.
USPTO Final Office Action in U.S. Appl. No. 11/305,286, dated Jun. 24, 2010, 39 pages.
USPTO Non-Final Office Action in U.S. Appl. No. 11/303,774, dated Apr. 4, 2008, 8 pages.
Fish & Richardson P.C., Amendment in Reply to Action dated Apr. 4, 2008 in U.S. Appl. No. 11/303,774, filed Aug. 29, 2008, 13 pages.
USPTO Non-Final Office Action in U.S. Appl. No. 11/303,774, dated Nov. 20, 2008, 8 pages.
Fish & Richardson P.C., Amendment in Reply to Action dated Nov. 20, 2008 in U.S. Appl. No. 11/303,774, filed Mar. 19, 2009, 12 pages.
USPTO Final Office Action in U.S. Appl. No. 11/303,774, dated Jun. 12, 2009, 8 pages.
Fish & Richardson P.C., Amendment in Reply to Action dated Jun. 12, 2009 in U.S. Appl. No. 11/303,774, filed Aug. 13, 2009, 15 pages.
USPTO Non-Final Office Action in U.S. Appl. No. 11/303,774, dated Sep. 10, 2009, 9 pages.
Fish & Richardson P.C., Amendment in Reply to Action dated Sep. 10, 2009 in U.S. Appl. No. 11/303,774, filed Dec. 10, 2009, 18 pages.
USPTO Final Office Action in U.S. Appl. No. 11/303,774, dated Mar. 10, 2010, 9 pages.
Fish & Richardson P.C., Amendment in Reply to Action dated Mar. 10, 2010 in U.S. Appl. No. 11/303,774, filed Jun. 10, 2010, 14 pages.
USPTO Non-Final Office Action in U.S. Appl. No. 11/402,744, dated Oct. 8, 2008, 14 pages.
Fish & Richardson P.C., Amendment in Reply to Action dated Oct. 8, 2008 in U.S. Appl. No. 11/402,744, filed Jan. 8, 2009, 15 pages.
USPTO Non-Final Office Action in U.S. Appl. No. 11/402,744, dated Apr. 17, 2009, 14 pages.
Fish & Richardson P.C., Amendment in Reply to Action dated Apr. 17, 2009 in U.S. Appl. No. 11/402,744, filed Aug. 17, 2009, 12 pages.
USPTO Final Office Action in U.S. Appl. No. 11/402,744, dated Nov. 25, 2009, 13 pages.
Fish & Richardson P.C., Amendment in Reply to Action dated Nov. 25, 2009 in U.S. Appl. No. 11/402,744, filed Feb. 25, 2010, 14 pages.
USPTO Non-Final Office Action in U.S. Appl. No. 11/402,744, dated Mar. 30, 2010, 14 pages.
USPTO Non-Final Office Action in U.S. Appl. No. 11/486,545, dated Aug. 19, 2009, 17 pages.
Fish & Richardson P.C., Amendment in Reply to Action dated Aug. 19, 2009 in U.S. Appl. No. 11/486,545, filed Nov. 19, 2009, 24 pages.
Fish & Richardson P.C., Supplemental Amendment in Reply to Action dated Aug. 19, 2009 in U.S. Appl. No. 11/486,545, filed Nov. 20, 2009, 24 pages.
USPTO Final Office Action in U.S. Appl. No. 11/486,545, dated Jan. 29, 2010, 13 pages.
Fish & Richardson P.C., Amendment in Reply to Action dated Jan. 29, 2010 in U.S. Appl. No. 11/486,545, filed Apr. 29, 2010, 19 pages.
USPTO Advisory Action in U.S. Appl. No. 11/486,545, dated May 7, 2010, 3 pages.
USPTO Non-Final Office Action in U.S. Appl. No. 11/955,644, dated Mar. 24, 2009, 16 pages.
Fish & Richardson, P.C., Amendment in Reply to Action dated Mar. 24, 2009 in U.S. Appl. No. 11/955,644, filed Jul. 24, 2009, 19 pages.
USPTO Notice of Informal or Non-Responsive Amendment in U.S. Appl. No. 11/955,644, dated Nov. 19, 2009, 6 pages.
Fish & Richardson, P.C., Amendment in Reply to Action dated Nov. 11, 2009 in U.S. Appl. No. 11/955,644, filed Nov. 11, 2009, 19 pages.
USPTO Final Office Action in U.S. Appl. No. 11/955,644, dated Feb. 3, 2010, 17 pages.
Fish & Richardson, P.C., Amendment in Reply to Action dated Feb. 3, 2010 in U.S. Appl. No. 11/955,644, filed May 3, 2010, 18 pages.
USPTO Advisory Action in U.S. Appl. No. 11/955,644, dated May 13, 2010, 3 pages.
Fish & Richardson, P.C., Preliminary Amendment in U.S. Appl. No. 09/891,103, filed Aug. 1, 2004, 11 pages.
USPTO Non Final Office Action in U.S. Appl. No. 09/891,103, dated Jan. 28, 2005, 8 pages.
Fish & Richardson, P.C., Amendment in Reply to Action dated Jan. 28, 2005 in U.S. Appl. No. 09/891,103, filed Jul. 29, 2005, 28 pages.
USPTO Final Office Action in U.S. Appl. No. 09/891,103, dated Nov. 3, 2005, 11 pages.
Fish & Richardson, P.C., Amendment in Reply to Action dated Nov. 3, 2005 in U.S. Appl. No. 09/891,103, filed Mar. 3, 2006, 24 pages.
USPTO Non Final Office Action in U.S. Appl. No. 09/891,103, dated May 17, 2006, 10 pages.
Fish & Richardson, P.C., Amendment in Reply to Action dated May 17, 2006 in U.S. Appl. No. 09/891,103, filed Nov. 20, 2006, 30 pages.
USPTO Non Final Office Action in U.S. Appl. No. 09/891,103, dated Jun. 11, 2007, 23 pages.
Fish & Richardson, P.C., Amendment in Reply to Action dated Jun. 11, 2007 in U.S. Appl. No. 09/891,103, filed Nov. 2, 2007, 32 pages.
USPTO Final Office Action in U.S. Appl. No. 09/891,103, dated Jan. 31, 2008, 24 pages.
Fish & Richardson, P.C., Amendment in Reply to Action dated Jan. 31, 2008 in U.S. Appl. No. 09/891,103, filed May 12, 2008, 36 pages.
USPTO Advisory Action in U.S. Appl. No. 09/891,103, dated Jun. 5, 2008, 3 pages.
Fish & Richardson, P.C., Amendment in Reply to Action dated Jan. 31, 2008 in U.S. Appl. No. 09/891,103, filed Jun. 30, 2008, 36 pages.

Fish & Richardson, P.C., Supplemental Amendment in Reply to Action dated Jan. 31, 2008 in U.S. Appl. No. 09/891,103, filed Jul. 10, 2008, 36 pages.
USPTO Non Final Office Action in U.S. Appl. No. 09/891,103, dated Sep. 16, 2008, 26 pages.
Fish & Richardson, P.C., Supplemental Amendment in Reply to Action dated Sep. 16, 2008 in U.S. Appl. No. 09/891,103, filed Jan. 14, 2009, 39 pages.
USPTO Non Final Office Action in U.S. Appl. No. 09/891,103, dated Apr. 29, 2009, 27 pages.
Fish & Richardson, P.C., Amendment in Reply to Action dated Apr. 29, 2009 in U.S. Appl. No. 09/891,103, filed Jul. 29, 2009, 40 pages.
Notice of Allowance in U.S. Appl. No. 09/891,103, dated Nov. 10, 2009, 4 pages.
Notice of Allowance in U.S. Appl. No. 09/891,103, dated Feb. 17, 2010, 4 pages.
Notice of Allowance in U.S. Appl. No. 09/891,103, dated Jun. 14, 2010, 6 pages.
Non Final Office Action in U.S. Appl. No. 11/640,619, dated Nov. 2, 2009, 18 pages.
Fish & Richardson, P.C., Amendment in Reply to Action dated Nov. 2, 2009 in U.S. Appl. No. 11/640,619, filed Mar. 2, 2010, 13 pages.
Interview Summary in U.S. Appl. No. 11/640,619, dated Mar. 12, 2010, 3 pages.
Non Final Office Action in U.S. Appl. No. 11/640,619, dated Jun. 18, 2010, 20 pages.
Non Final Office Action in U.S. Appl. No. 11/037,896, dated Nov. 21, 2007, 15 pages.
Fish & Richardson, P.C., Amendment in reply to Action dated Nov. 21, 2007 in U.S. Appl. No. 11/037,896, dated Feb. 21, 2008, 20 pages.
Final Office Action in U.S. Appl. No. 11/037,896, dated Jul. 10, 2008, 27 pages.
Non Final Office Action in U.S. Appl. No. 11/037,896, dated Feb. 5, 2009, 26 pages.
Fish & Richardson, P.C., Amendment in reply to Action dated Feb. 5, 2009 in U.S. Appl. No. 11/037,896, dated May 5, 2009, 26 pages.
Final Office Action in U.S. Appl. No. 11/037,896, dated Sep. 10, 2009, 29 pages.
Fish & Richardson, P.C., Amendment in reply to Action dated Sep. 10, 2009 in U.S. Appl. No. 11/037,896, dated Jan. 1, 2010, 26 pages.
Fish & Richardson, P.C., Amendment in reply to Action dated Jun. 16, 2010 in U.S. Appl. No. 11/037,896, dated Jun. 28, 2010, 21 pages.
Notice of Allowance in U.S. Appl. No. 11/037,896, dated Feb. 22, 2010, 6 pages.
Notice of Allowance in U.S. Appl. No. 11/037,896, dated Jun. 16, 2010, 5 pages.
Non Final Office Action in U.S. Appl. No. 11/167,785, dated Nov. 15, 2007, 7 pages.
Fish & Richardson, P.C., Amendment in reply to Action dated Nov. 15, 2007 in U.S. Appl. No. 11/167,785, dated Apr. 10, 2008, 14 pages.
Final Office Action in U.S. Appl. No. 11/167,785, dated Jul. 21, 2008, 10 pages.
Non Final Office Action in U.S. Appl. No. 11/167,785, dated Jun. 22, 2009, 9 pages.
Fish & Richardson, P.C., Amendment in reply to Action dated Jun. 22, 2009 in U.S. Appl. No. 11/167,785, dated Sep. 22, 2009, 18 pages.
Final Office Action in U.S. Appl. No. 11/167,785, dated Jan. 11, 2010, 11 pages.
Fish & Richardson, P.C. Amendment in reply to Action dated Jan. 11, 2010 U.S. Appl. No. 11/167,785, dated Apr. 12, 2010, 16 pages.
Non Final Office Action in U.S. Appl. No. 11/167,785, dated Apr. 28, 2010, 9 pages.
USPTO Notice of Allowance in U.S. Appl. No. 11/303,774, dated Aug. 31, 2010, 4 pages.
USPTO Notice of Allowance in U.S. Appl. No. 11/486,545, dated Jul. 28, 2010, 8 pages.
USPTO Final Office Action in U.S. Appl. No. 11/305,286, dated Jun. 24, 2010, 39 pages.
Response filed Aug. 9, 2010 to GB Examination Report for Application No. 0811839.0, dated Jun. 3, 2010 (10 pages).
Response filed Aug. 2, 2010 to Chinese office action for Chinese application No. 20058002423.0 dated May 17, 2010 (40 pages).

USPTO Final Office Action in U.S. Appl. No. 11/303,773, dated Aug. 18, 2010, 12 pages.
Fish & Richardson, P.C., Amendment in Reply to Action dated Mar. 30, 2010 in U.S. Appl. No. 11/402,744, filed Aug. 30, 2010, 12 pages.
Notice of Allowance in U.S. Appl. No. 11/303,774, dated Aug. 31, 2010, 4 pages.
Australian (AU) Examination Report for Application No. 2005426813, Jun. 4, 2009 (18 pages).
Office action and response history of U.S. Appl. No. 11/402,744 to Aug. 17, 2009.
Office action and response history of U.S. Appl. No. 11/486,545 to Aug. 26, 2009.
3rd Generation Partnership Project 2 "3GPP2", "cdma2000 High Rate Packet Data Interface Specification", C.S0024, version 2, Oct. 27, 2000 (441 pages).
3rd Generation Partnership Project 2 "3GPP2", "cdma2000 High Rate Packet Data Interface Specification", C.S0024-B, version 2, Mar. 2007 (1627 pages).
Library Search for Nortel and frequency handoff. Search results dated Aug. 28, 2009 (85 pages).
Office action and response history of U.S. Appl No. 11/037,896 to Sep. 17, 2009.
Office action and response history of U.S. Appl No. 11/303,774 to Sep. 17, 2009.
Fish & Richardson, P.C., Supplemental Amendment in Reply to Action dated Jun. 18, 2010 in U.S. Appl. No. 11/640,619, filed on Oct. 18, 2010, 20 pages
USPTO Final Office Action in U.S. Appl. No. 11/167,785, dated Oct. 15, 2010, 10 pages.
USPTO Supplemental Notice of Allowance in U.S. Appl. No. 09/891,103, dated Oct. 15, 2010, 4 pages.
Fish & Richardson, P.C., Amendment in Reply to Action dated Jun. 24, 2010 in U.S. Appl. No. 11/305,286, filed on Oct. 25, 2010, 31 pages.
USPTO Final Office Action in U.S. Appl. No. 11/402,744, dated Nov. 12, 2010, 22 pages.
Supplemental Notice of Allowability in U.S. Appl. No. 11/303,774, dated Nov. 22, 2010, 9 pages.
Notice of Allowability in U.S. Appl. No. 11/486,545, dated Nov. 8, 2010, 6 pages.
Notice of Allowance in U.S. Appl. No. 11/303,774, dated Dec. 21, 2010, 8 pages.
Final Office Action in U.S. Appl. No. 11/640,619, dated Jan. 7, 2011, 24 pages.
Notice of Allowance in U.S. Appl. No. 11/037,896, dated Jan. 5, 2011, 5 pages.
Notice of Allowance in U.S. Appl. No. 11/303,773, dated Dec. 30, 2010, 9 pages.
Fish & Richardson, P.C., Amendment in Reply to Final Office Action dated Nov. 12, 2010 in U.S. Appl. No. 11/402,744, filed on Feb. 14, 2011, 12 pages.
Japanese Office action of application No. 2007-527408 issued Nov. 24, 2010, mailed Nov. 29, 2010 with English translation (21 pages).
Notice of Allowability in U.S. Appl. No. 11/486,545, dated Mar. 11, 2011, 9 pages.
USPTO Supplemental Notice of Allowance in U.S. Appl. No. 09/891,103, dated Mar. 14, 2011, 6 pages.
USPTO Non-Final Office Action in U.S. Appl. No. 11/402,744, dated Apr. 1, 2011, 14 pages.
Notice of Allowance in U.S. Appl. No. 11/303,774, dated Apr. 4, 2011, 7 pages.
Notice of Allowance in U.S. Appl. No. 11/303,773, dated Apr. 15, 2011, 6 pages.
International Preliminary Report on Patentability for PCT international application No. PCT/US2006/047524, mailed Apr. 28, 2011 (8 pages).
Notice of Allowance in U.S. Appl. No. 11/037,896, dated May 17, 2011, 8 pages.
Response filed May 30, 2011 to Japanese Office action issued in application No. 2007-527408, Nov. 24, 2010, mailed Nov. 29, 2010 (31 pages).

* cited by examiner

| Session Index | 1 | 2 | 3 | 4 | ... | N |
|---|---|---|---|---|---|---|
| UATI | UATI 1 | UATI 2 | UATI 3 | UATI 4 | | UATI I |
| HwID | HwID 1 | HwID 2 | HwID 3 | HwID 4 | | HWID I |
| PSI | PSI 1 | PSI 2 | PSI 3 | PSI 4 | | PSI I |
| Control Cycle | 32 | 23 | 12 | 10 | | CC I |
| Sector ID | Sector ID 1 [6] | Sector ID 2 [6] | Sector ID 3 [6] | Sector ID 4 [6] | | Sector ID I [6] |
| Flags | | Failed RNSM | Failed RNSM | | | |
| RNSM | RNSM 1 | RNSM 2 | RNSM 2 | RNSM 1 | | RNSM I |

FIG. 9

PRESERVING SESSIONS IN A WIRELESS NETWORK

TECHNICAL FIELD

This disclosure relates to the preservation of communication sessions with client devices in a wireless network communication system despite a failure in components of the communications systems.

BACKGROUND

In a fixed or mobile wireless Internet Protocol (IP) network, a client-side device establishes a session with a network-side access device to communicate with other entities in that network. The session represents the client-side device to the network, and includes information about the client-side device such as its IP address, location within a mobility area, permitted services and other such attributes required to communicate with the client-side device. The session may be partitioned into separate data elements representing IP connectivity and link-layer connectivity and these data elements may be stored on separate network elements. The session is typically present as long as the client-side device is present in the network, though other resources required for direct communication between the client-side device and the network device may only be in use when active communication is in process.

The state of direct communication between the client-side device and the network-side device is known as a connection. In cellular wireless systems, as the client device must initiate connection, a special procedure known as paging is used to allow the network to request the client device to communicate. For example, if a network device needs to send data to a client device, the network uses the information stored in a session associated with the client device to page the client device. Paging involves transmitting a message addressed to a particular terminal over a shared channel monitored by all terminals in communication with that part of the network. This page causes the client device to initiate a connection with the network, thus enabling an exchange of data. However, if a hardware or software failure of a network-side device causes the network to lose the session information (referred to as a "session breach"), the network cannot establish a direct communication with the client device, as it has lost all knowledge of the device's identity, communication parameters and location required to page that particular device. A session for which session information has been lost due to hardware or software failure of a network-side device is referred to as a "breached session." Because the session breach is not visible at the IP (Internet Protocol) layer, the client's peers are unaware that the client is unreachable. Thus, network-initiated connection-oriented applications such as online video teleconferencing and Internet telephony are particularly vulnerable to network-side failures. Furthermore, the client device is not immediately aware that the session breach has occurred and its recovery mechanisms operate on a sufficiently long timescale that client-initiated creation of a new session cannot be counted upon to restore network reachability for that client before it is required.

SUMMARY

In one aspect, reestablishing a session may be accomplished by saving at least a portion of session information associated with a first session between an access terminal (e.g., a cellular telephone, a personal data assistant, or a laptop computer) and a first wireless network device; and in response to detecting an unexpected degradation of the first session, triggering a reestablishment of the first session using the portion of the session information.

Implementations may include one or more of the following features. Degradation may include cessation and detecting a degradation of the first session may include detecting a state (e.g., failure) of the first wireless device. Triggering a reestablishment of the first session may include transmitting, to the access terminal, a close session message. A first session may be replicated without being closed and restored upon receiving a request to open a new session from the access terminal. The triggering may comply with a 1x Evolution-Data Optimized protocol and/or be based on a load state of a second wireless network device.

Transmitting a close session message may occur immediately upon detection of a unexpected degradation of the first session and/or after receiving a request to transmit data to the access terminal. Degraded sessions may be placed in a queue and moved up in the queue in response to receiving a request to transmit data to an access terminal associated with the degraded session. Degraded sessions may include breached sessions. The session information for the session assigned to the access terminal may be deleted if the access terminal has failed to request to open a new session and/or a second wireless network device fails to reestablish the first session after a predetermined time has elapsed. The first session may be established between the access terminal and a first wireless network device. The session information may be saved on a second wireless network device that generates and/or transmits the close session message.

A second session may be established between the access terminal and the second wireless network device; and at least a portion of the second session information that sufficient to reestablish the second session may be saved to a third wireless network device. The portion of the second session information may be sufficient to generate a close session message for the access terminal for the second session. In response to receiving a close session message, a breached session may be reestablished by closing the breached session and sending a request to open a new session.

In another aspect, a radio network controller includes a first radio node server module configured to establish a session with a first access terminal; a storage device (e.g., non-volatile random access memory, a flash memory, and a disk memory) configured to store at least a portion of the session information that is sufficient to reestablish the session; and a control mechanism configured to cause a second radio node server module device to reestablish the session with the access terminal after detecting a degradation of the session between the first radio node server module and the access terminal.

Implementations may include one or more of the following features. The session information may be sufficient to generate a close session message and/or complies with a 1x Evolution-Data Optimized protocol. The control mechanism may be configured to transmit the close session message to the access terminal and to retrieve the portion of the session information from the storage device and send the portion to the second radio node server module without causing the session to be closed. The second radio node server module may transmit a close session message immediately after the control mechanism detects a degradation of the session between the first radio node server module and the access terminal. A degradation may include a cessation. The second radio node server module may transmit a close session message only after the control mechanism receives a request to transmit data to the access terminal. Degraded sessions may be placed in a queue such that a closed session is moved to a higher entry of the queue when a request is received to transmit data to an access terminal associated with at least one of the degraded sessions. The first radio node server module may include a first processing card and the second radio node server module may include a second processing card. The control mechanism may be implemented on a processor that is connected to the first radio node server module and to the second radio node server module through a high speed bus. The control mechanism may be implemented on the second radio node server module or on a third radio node server module.

In another aspect, reestablishing breached sessions in a wireless communications network is accomplished by placing a first session that has been breached in a queue for reestablishment of the first session; placing a second session that has been breached in the queue for reestablishment of the second session, which is prioritized below the first session in the queue; and promoting the second session above the first session in the queue in response to receiving a request to transmit data to an access terminal associated with the second session.

Implementations may include one or more of the following features. The wireless communications network may use a 1x Evolution-Data Optimized protocol. Reestablishment of the second session may be triggered by generating and transmitting a close session message to the access terminal associated with the second session. Reestablishment may also be triggered based on a load state of a second wireless network device. The second session may be reestablished between a wireless network device and the access terminal. Triggering reestablishment of the first session may be performed after triggering reestablishment of the second session, and in some examples, only after receiving a request to transmit data to an access terminal associated with the first session. The time that the first session has spent in the queue may be monitored and the first session may be deleted if it has occupied an entry in the queue past a predetermined time period.

These general and specific aspects may be implemented using a system, a method, or a computer-readable medium, or any combination of systems, methods, and computer-readable mediums.

The details of one or more embodiments of the invention are set forth in the accompanying drawings and the description below. Other features, objects, and advantages of the invention will be apparent from the description and drawings, and from the claims.

DESCRIPTION OF DRAWINGS

FIG. 9 depicts the Session Database of FIG. 3 and FIG. 4.

DETAILED DESCRIPTION

Session breaches caused by network-side hardware and/or software failures can be remedied by saving a complete copy of each user session at an alternate location that is not likely to fail at the same time as the location hosting the primary copy of that user session. As the session data changes whenever the state of the client device changes, it must only be saved when in particular states known to be consistent between the network and the client device. These states are unique to the wireless communication protocol in use and the internal design of the RNC. For this approach to be effective, all saved states must be such that a client device may immediately open a connection upon restoration of the session to that saved state.

Session breaches can also be remedied by transmitting a message to a client-side device instructing the client-side device to close the current session and reopen a new session with the network. For example, the 1x-Evolution Data Optimized (1xEV-DO) protocol currently defined in the IS856 family of standards, as defined by the 3GPP2 organization, provides for a "close session message". A close session message is a message that can be sent by either a client-side or network-side device to close a user session. For example, a client-side device (referred to as an "access terminal" in the 1x EV-DO protocol) may send a close session message to the network when the device is powering off or when its 1x EV-DO application is shut down. A network side device, such as a radio network controller, may send a close session message when it is shutting down or attempting to perform some form of overload control due to constrained resources. When an access terminal receives a close session message, it is required under the 1x EV-DO protocol to close its current session with the network. It will reopen a new session if it anticipates further communication with the network. Client devices that participate in network-initiated applications such as telephony always reopen new sessions as long as they are powered on. Therefore, a network-side device can use the close session message to reestablish session information lost due to a network-side failure. Moreover, because the information necessary to generate and transmit a close session message is less than the total amount of session information stored by a network-side device, the network does not need to maintain a complete backup of each session established on the network at a particular time. The benefit of this is that the network can maintain a larger number of user sessions for a given amount of memory available on the network-side device.

Figure 1:
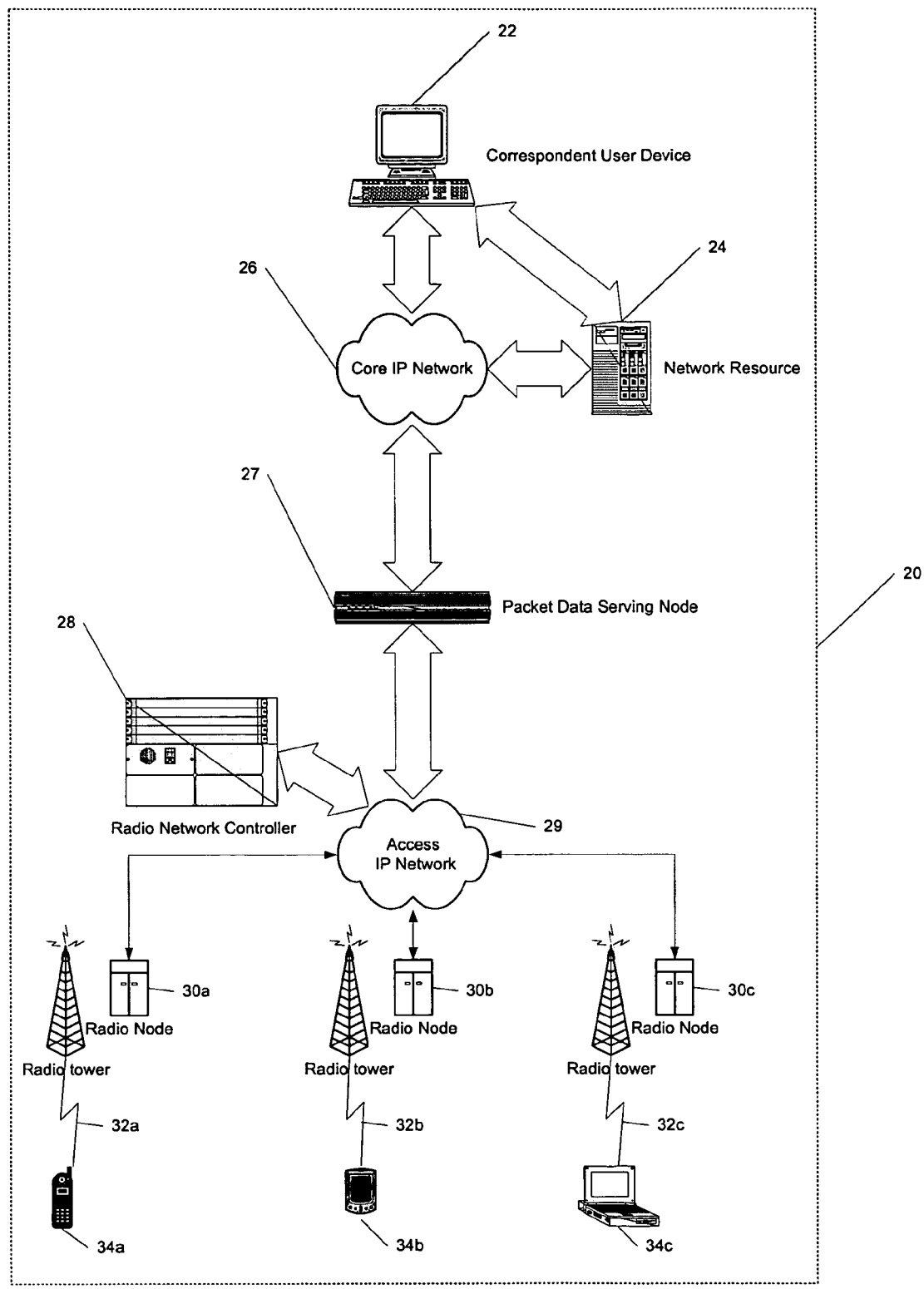
FIG. 1 shows a block diagram of a wireless network system.

Referring to FIG. 1, a wireless IP network 20 includes a correspondent user device 22, a core IP network 26, a network resource 24, a radio network controller (RNC) 28, a Packet Data Serving Node (PDSN) 27, an access IP network 29, and multiple radio nodes (RN), three of which are shown 30a-30c, that each communicate with an access terminals (AT) 34a-34c using an airlink 32a-32c.

The access terminals, e.g., AT 34a, are the client-side of the wireless network and Internet protocol, and may be implemented as a mobile device such as a cellular telephone, a wireless PDA, a handheld gaming device, or a wireless laptop computer or a stationary device such as a desktop computer, a parking meter, or other fixed device with which wireless communication is desired.

The correspondent user device 22 connects to a core IP network 26 through an optional network resource 24 such as a telephony gateway and represents the device with which the ATs communicate over the wireless IP network. For example, the correspondent user device 22 may consist of an Internet telephone that permits a user at the device 22 to engage in a voice over IP call with a user associated with an AT. Similarly, if the ATs include a network of wireless-enabled parking meters, a user at the device 22 may use a graphical user interface to send messages to each parking meter instructing it to provide status information (e.g., space-filled/time paid; space-filled/time expired; space-empty/time remaining, space-empty/time expired, etc.). If the correspondent user device is a traditional telephone, it may connect through an optional network resource in the form of a media gateway and a soft switch that together form an interface between an IP network and a traditional telephone network.

The core IP network 26 is a network of devices that use the TCP/IP network protocols to exchange data. The core IP network 26 may, for example, comprise the public Internet or a private intranet. In a CDMA cellular data system, the core IP network 26 interfaces with the wireless network through a Packet Data Serving Node (PDSN) 27.

The RNC 28 communicates with the PDSN 27 and with the RNs 30a-30c over the access IP network 29 controls the radionodes' transmitters and receivers, initiates and maintains client sessions, directs data packets received from the core IP network 26, and performs other radio access and link maintenance functions such as soft handoff and sector selection. The access IP network 29 may be a private network that is designed and operated exclusively for communication between PSDN 27, RNC 28, and RNs 30a-c.

Figure 2:
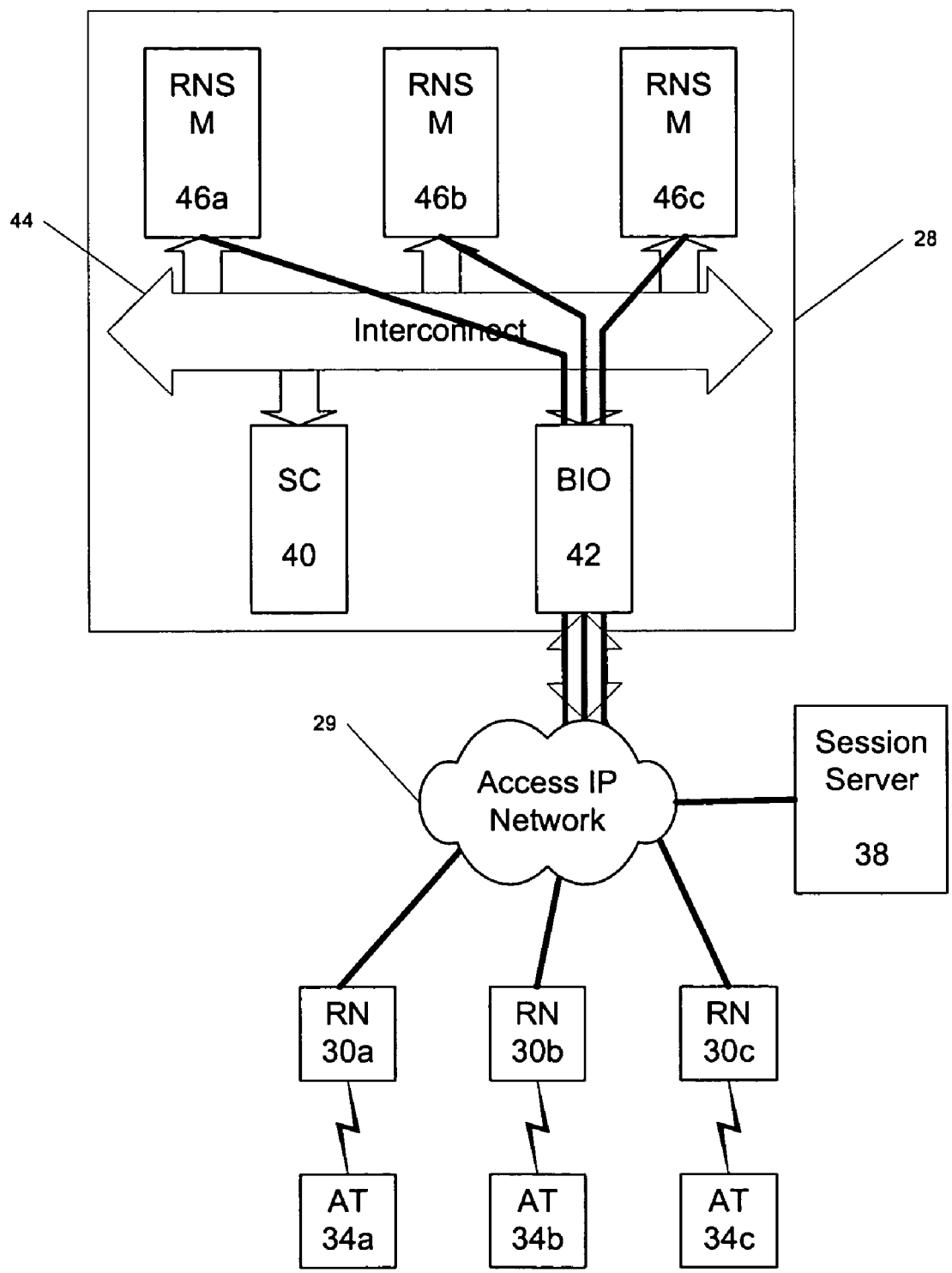
FIG. 2 shows internal modules of a radio network controller (RNC).

Referring to FIG. 2, the RNC 28 includes a System Controller (SC) 40, one or more Base Input/Output modules (BIO) 42, and one or more Radio Node Server Modules 46a-46c (collectively referred to as RNSMs 46) that are interconnected over a high-speed bus 44 such as a PCI, VMEbus, USB, ISA, or PXI bus or switched fabric such as ATM (or other cell-based fabric) or Ethernet (or other packet-based fabric). Each of the three Radio Node Server Modules 46a-46c shown communicate with an AT 34a-34c using a radio node 30a-30b. In reality, each RNSM will typically use multiple radio nodes to communicate with many ATs at any particular time. For simplicity, however, only one radio node per RNSM and one AT per node are illustrated.

Each RNSM 46a, 46b, 46c is responsible for establishing and maintaining a session with the ATs that they are assigned to handle by the System Controller (SC) 40. As previously mentioned, a session must be established before data can be exchanged. During the lifetime of a session maintained by an RNSM, the RNSM continually sends session status information to the SC 40 or to an optional Session Server 38. If an RNSM fails, the SC detects the failure through heartbeat messages for which it receives no response. If an RNSM reboots or otherwise recovers, it registers its presence with the SC 40, thus alerting the SC 40 to its availability to provide service.

Figure 3:
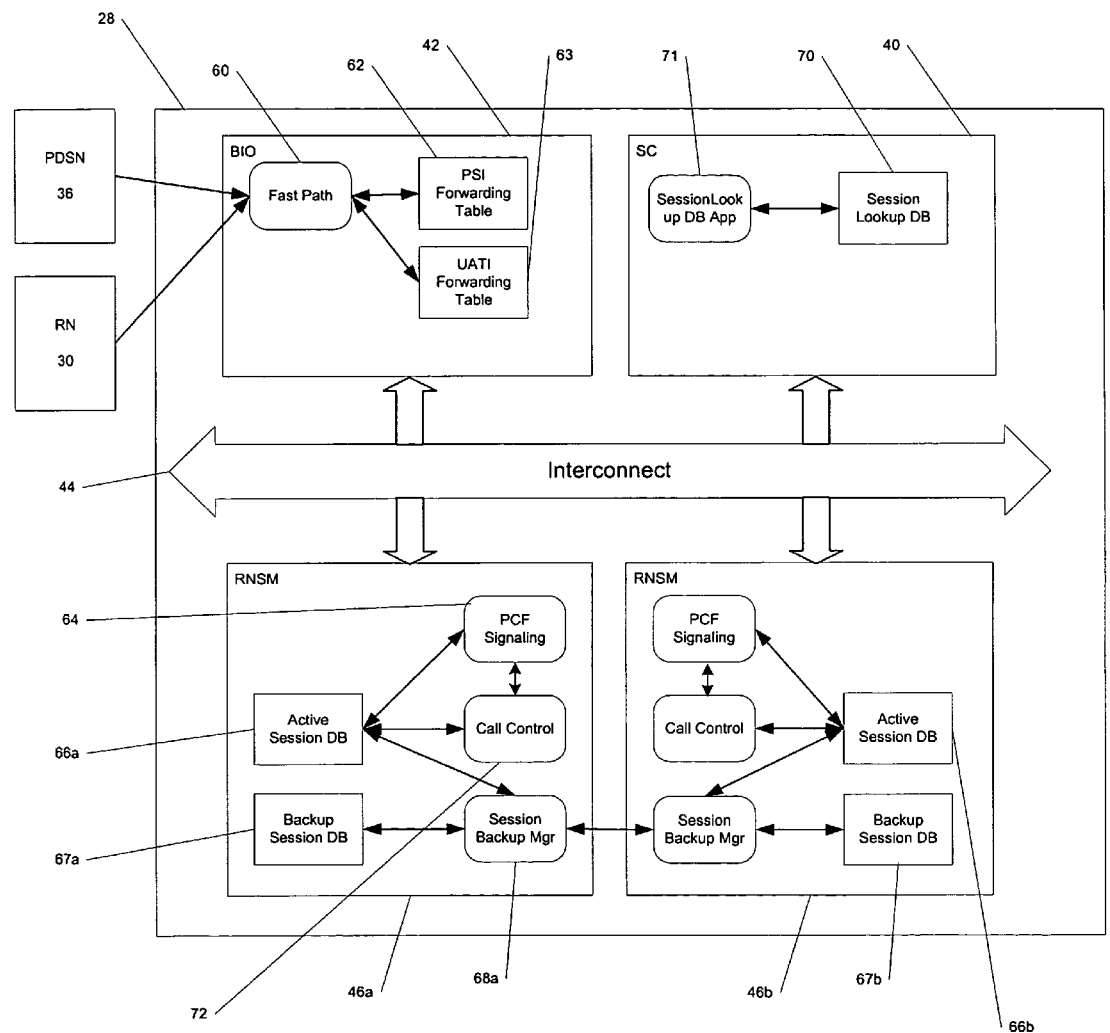
FIG. 3 depicts the RNC internal modules of FIG. 2 in greater detail.

Referring to FIG. 3, the System Controller 40, which generally functions to perform protocol route computations, system configuration, network management, and centralized signaling, also maintains a session lookup database 70 of the current sessions established between the RNSMs 46a-46c and the ATs. This database 70 is normally not a backup of all session information maintained by the RNSMs but includes information sufficient to identify the RNSM on which a particular session is hosted. The session may be located by multiple identifiers, such as International Mobile Subscriber Identity (IMSI), Unicast Access Terminal Identifier (UATI), or hardware ID. This database 70 may also be implemented on a separate Session Server 38. The use of a Session Server 38 enables location of sessions across multiple RNC chassis. The session lookup database 70 is accessed and updated by a session lookup database application 71.

The Base I/O Module 42 functions to connect the RNC 28 with the access IP network 29 and the PDSN 27. It receives packets destined for the PDSN 27 and the RNs 30 from the RNSMs 46 and SC 40 and transmits them over its network interfaces to the access IP network 29. It also receives packets from the PDSN 36 and the RNs 30 from the access IP network 29 and routes them to the RNSMs 46 and SC 40. For packets received from the PDSN 36, the BIO 42 extracts the PDSN/PCF-specific identifier (PSI) field from the packet and looks it up in its PSI forwarding table 62 to find the identity of the RNSM (e.g., RNSM 46a) on which the corresponding session is located. For packets received from the RNs 30 over the airlink access channel, the BIO 42 extracts the Unicast Access Terminal Identifier (UATI) from the packet and looks it up in its UATI forwarding table 63 to find the identity of the RNSM (e.g., RNSM 46a) on which the corresponding session is located.

The RNSM (e.g., RNSM 46a) functions to perform the wireless-specific protocol functions necessary to implement the RNC's call processing and data handling capabilities. The call processing functions are implemented by the Call Control 72 component. The Call Control 72 component interacts with the Packet Control Function (PCF) Signaling 64 component that implements the portions of call processing that pertain to the interface with the PDSN 27. The Call Control 72 component and the PCF Signaling 64 component maintain the state of the sessions that they set up as part of call processing in the Active Session Database 66a.

To preserve user reachability after session breach, a Session Backup Manager 68a on RNSM 46a interacts with a Session Backup Manager 68b on RNSM 46b to maintain a Backup Session Database 67a on RSNM 46a that is a backup of the Active Session Database 66b on RNSM 46b and a Backup Session Database 67b on RNSM 46b that is a backup of the Active Session Database 66a on RNSM 46a. This diagram shows a specific case of two RNSMs 46a and 46b protecting each other.

Protection Models

Figure 4:
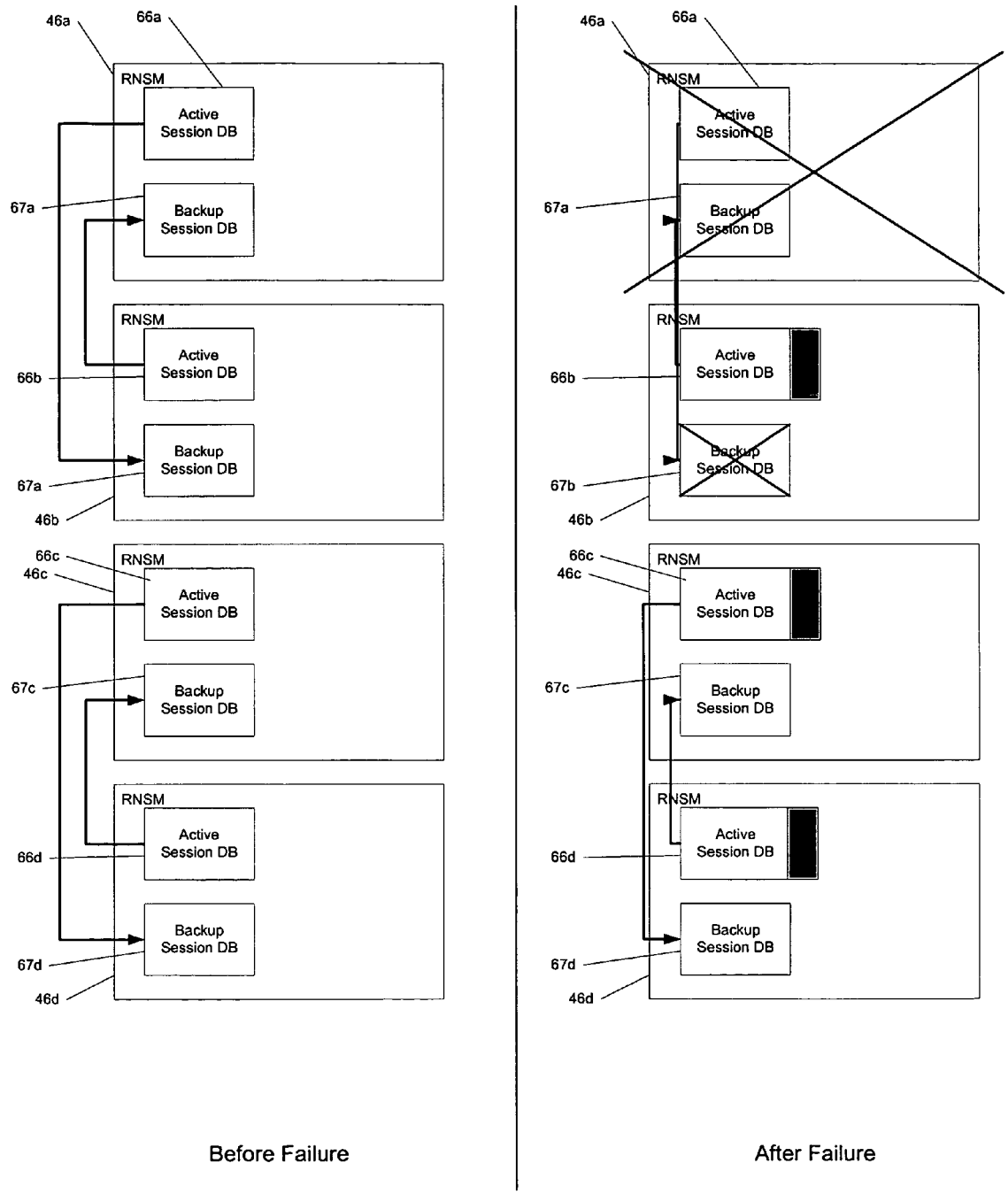
FIG. 4 depicts the relationship between protected RNSMs and their session data.

Referring to FIG. 4, the RNSMs 46 are configured such that RNSM 46a maintains a Backup Session Database 67a to protect the Active Session Database 66b on RNSM 46b and RNSM 46b maintains Backup Session Database 67b to protect the Active Session Database 66a on RNSM 46a. RNSM 46c and RNSM 46d have a similar configuration where each RNSM maintains a backup of the other's session database. In some embodiments, SC 40 maintains a Backup Session Database for one or more of the RNSMs 46.

In the event of failure of RNSM 46*a*, RNSM 46*b* distributes its Backup Session Database 67*b* to itself and the other RNSMs 46*c* and 46*d* as shown by the gray shaded extensions to the Active Session Databases 66*b*, 66*c* and 66*d*. The options for processing these sessions are described more below. Note that, in this protection strategy, an even number of RNSMs 46 are populated into the RNC 28 to guarantee that every RNSM's session database is protected. If a new RNSM is added to the RNC 28, it may be paired up with an odd remainder RNSM that was existing in the RNC or can remain unprotected until an additional RNSM is added to the RNC.

In some implementations, each RNSM in the RNC protects one other RNSM, for example, the RNSM located to its right in the RNC's chassis with the rightmost RNSM in the chassis is responsible for protecting the leftmost RNSM in the chassis. In this manner, an RNSM protection ring is established. Thus, in this protection scheme any number of RNSMs (greater than or equal to 2) can be populated in an RNC with protection. As new RNSMs are added to the RNC, they are inserted into the protection ring, such that two other RNSMs break their existing protection relationship and establish a protection relationship with the newly added RNSM.

In some other implementations, each RNSM in the RNC may partially protect multiple other RNSMs in the RNC such that each RNSM is fully protected by a set of other RNSMs.

The RNSM population of the RNC chassis can be determined at power-on of the RNC, even though the RNSMs may complete their software initialization in a random order. However, because the RSNM population can be determined at power-on, in some implementations, a protection arrangement is selected at power-on but the protection does not begin until after a configurable hold-down time to allow all the RNSMs to initialize. In the event of a late appearance of an RNSM, e.g., due to failure at the RNC initialization time, it is treated as an insertion of a new RNSM module into the RNC chassis.

Recovery Models

Figure 5A:
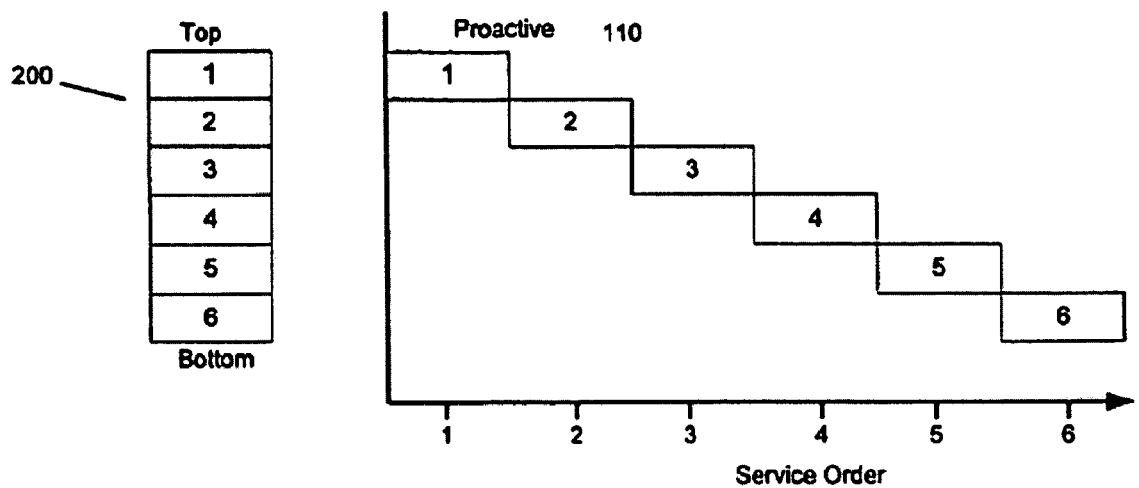
FIG. 5A illustrates the order in which sessions are closed for proactive session closure.

The traditional approach to implementing any form of redundancy-based reliability consists of maintaining a backup of the data to be protected and restoring that data upon detection of failure of the primary copy of the data. FIG. 5A shows the traditional service order for restoring this data, referred to as Proactive Service Order. In this approach, the backup data is ordered in some fashion and is restored according to its existing order.

Figure 5B:
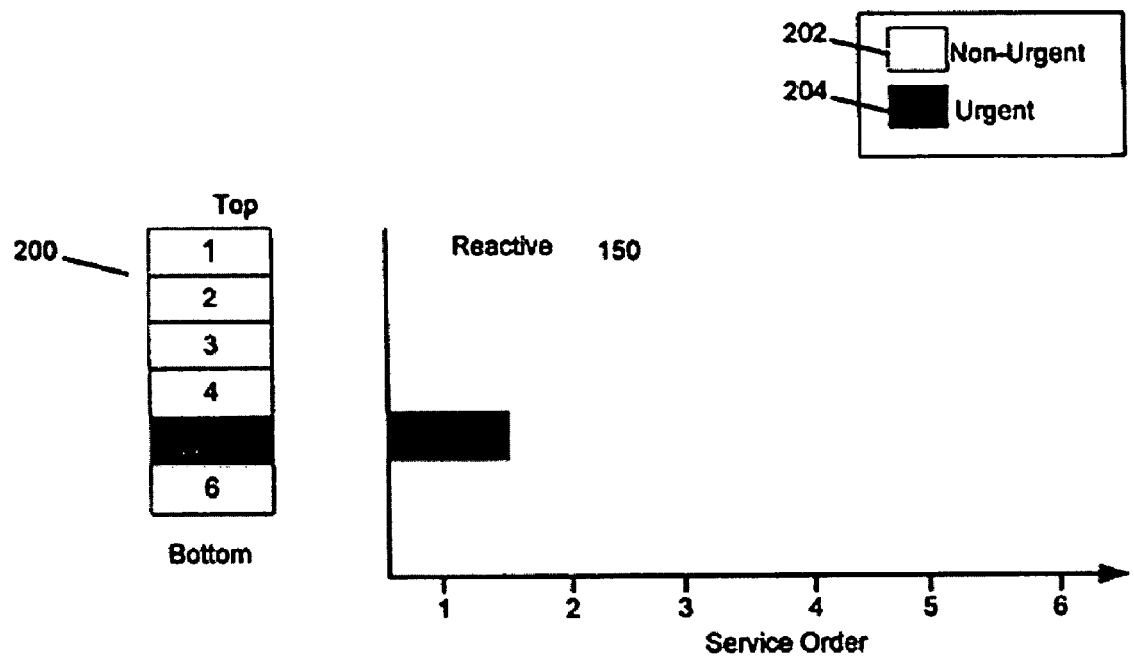
FIG. 5B illustrates the order in which sessions are closed for reactive session closure.

If the restoration of a session takes a significant amount of time, the proactive approach may result in longer outages of service than tolerable as the user sessions are restored in an order independent of which users are actually active and would have benefited from session restoration. In a CDMA system, network-side reachability is required only when the network, in the form of the packet data servicing node (PDSN), has a packet to send to the AT. Thus, it is possible to defer restoration of any given session until a packet destined to the AT represented by that session is received from the PDSN 27. This is referred to as Reactive Session Restoration and its service order is depicted in FIG. 5B. This approach minimizes the outage perceived by an average session but has a constant value for the outage perceived by a session that was required to be restored. It also has the property that session state has to be preserved for a long time after failure of an RNSM while waiting for packets to arrive from the PDSN 27 prior to the expiration of the session lifetime.

Figure 5C:
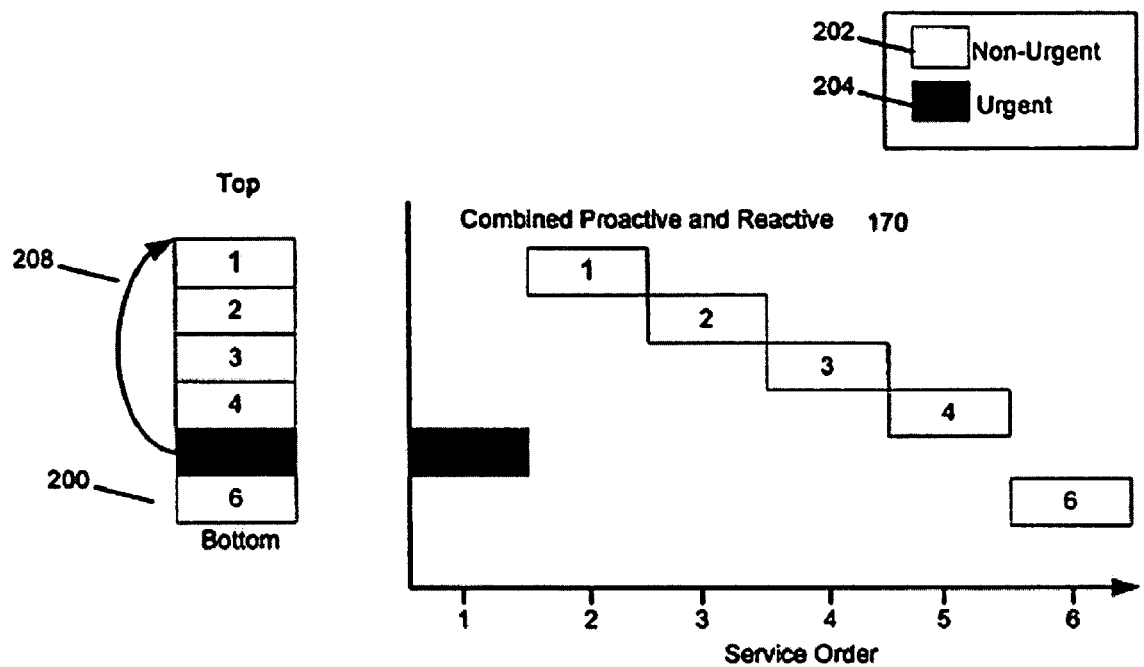
FIG. 5C illustrates the order in which sessions are closed for combined proactive and reactive session closure.

A hybrid scheme is proposed, referred to as Proactive plus Reactive. In this approach, sessions are restored according to their order in the Backup Session Database as in the Proactive Approach. If, however, a packet arrives from the PDSN 27 for a session that has not already been closed, that session is promoted to the head of the list for restoration. FIG. 5C shows this service order.

Session Backup and Restoration

One general approach to preserving user reachability in the event of session breach is to save all information associated with user sessions to an alternate location and restore that information in the event of an RNSM failure. This general approach can be implemented in many different ways, some of which are described below.

For example, in a first approach, all sessions hosted on a particular RNSM, known as the primary RNSM, may be stored on another RNSM, known as the backup RNSM, that is dedicated to the function of storing the session data for the primary RNSM. In this approach, each RNSM in the RNC chassis has a designated backup RNSM that is idle until it takes over the function of a failed primary RNSM. The backup RNSM constantly monitors the correct functioning of the primary RNSM and, in the event of failure of the primary RNSM, assumes the function of that primary RNSM and activates its copy of the user sessions that existed on the primary RNSM. The processing capacity of the RNC is, therefore, constrained to that of half the number of RNSMs in that RNC. This approach is known as 1:1 RNSM Redundancy.

In a second approach, a group of primary RNSMs is protected by a single backup RNSM that stores a copy of the session state for all of those primary RNSMs simultaneously. This backup RNSM constantly monitors the correct functioning of all its primary RNSMs and, in the event of failure of any primary RNSM, assumes the function of that primary RNSM and activates its copy of the user sessions that existed on that primary RNSM. The processing capacity of the RNC is, therefore, reduced by one RNSM for every group of protected primary RNSMs. This approach is known as 1:N RNSM Redundancy, where N is the number of primary RNSMs protected by a single backup RNSM.

A third approach involves storing a copy of the session state for any given RNSM on a single RNSM that is itself a primary RNSM. In this model, pairs of RNSMs are associated so that each is the backup RNSM for the other. This model is known as the "buddy system" and is depicted in FIG. 4 and described previously. RNSMs may be associated symmetrically, where one RNSM protects another RNSM and that RNSM protects the first RNSM, or asymmetrically, where the RNSM protecting a particular RNSM may be protected by a different RNSM.

A fourth approach involves storing a copy of the session state for any given RNSM across all other RNSMs in the RNC. Thus, every RNSM is maintaining its own sessions and a copy of some of the sessions from every other RNSM in the RNC. In the event of an RNSM failure, each of the other RNSMs in the RNC activates its copy of the user sessions associated with the faulty RNSM.

A fifth approach involves storing a copy of the session state for all RNSMs in the RNC on a centralized resource within the RNC, for example the system controller.

A sixth approach involves storing a copy of the session state for all RNSMs in the RNC on a dedicated session server 38 external to the RNC.

Regardless of the particular backup mode, session state may be stored in several ways. First, it may be stored to Random Access Memory (RAM). Second, it may be stored to non-volatile Random Access Memory in the form of battery-backed up RAM or FLASH memory. Finally, it may be stored to a hard disk drive.

Figure 6:
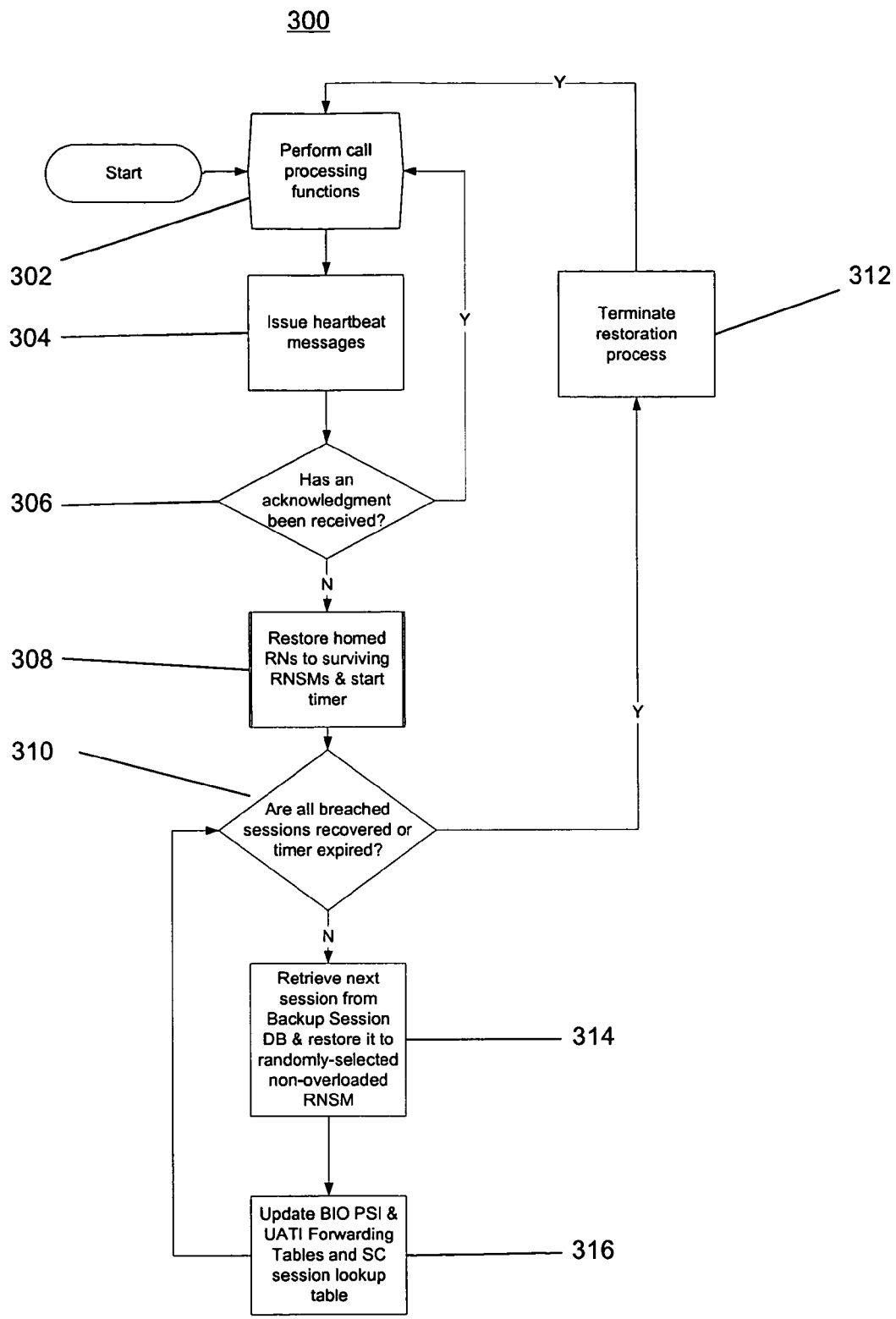
FIG. 6 illustrates the logic of proactive session restoration performed by the Protecting RNSM of FIG. 4.

FIG. 6 shows a process for proactive session restoration performed by a backup RNSM (e.g., RNSM 46a). The backup RNSM continually issues (304) heartbeat messages to the active RNSM (e.g., RNSM 46b) while performing (302) normal call processing functions. If the active RNSM is working properly, it sends an acknowledgement of the heartbeat messages to the backup RNSM. If the backup RNSM receives (306) an acknowledgement from the active RNSM, it continues to perform (302) normal call processing functions. If the backup RNSM does not receive (306) an acknowledgement from the active RNSM, the active RNSM is faulty and its sessions are breached. Thus, the backup RNSM begins the session recovery process. During this process, the backup RNSM triggers (308) the rehoming of all RNs that were served by the failed active RNSM to working RNSMs and starts a timer. The timer may be used to terminate the session restoration process in situations where session restoration may not terminate normally. The backup RNSM then retrieves the sessions from its backup session database and restores (314) them evenly to each of the working RNSMs in the RNC, including itself. In some embodiments, the backup RNSM randomly allocates individual sessions or groups of sessions to itself and the other RNSMs. For example, if there were 8 RNSMs in an RNC and 20000 sessions per RNSM, failure of one RNSM may result in the restoration of 2857 sessions to each RNSM on average. If a particular working RNSM indicates that it is overloaded, the backup RNSM may not assign additional sessions to that RNSM, in order to avoid exacerbating the overload condition. As each session or group of sessions is restored, the backup RNSM updates (316) the UATI and PSI forwarding tables of the BIOs so that subsequent traffic destined for that session will be routed properly. Upon determining (310) that either the timer has expired or that all of the breached sessions have been restored, the backup RNSM terminates (312) the restoration process, which includes deleting all unrecovered sessions. The backup RNSM also enters a non-protecting mode, in which it no longer sends heartbeat messages to other RNSMs.

Figure 7:
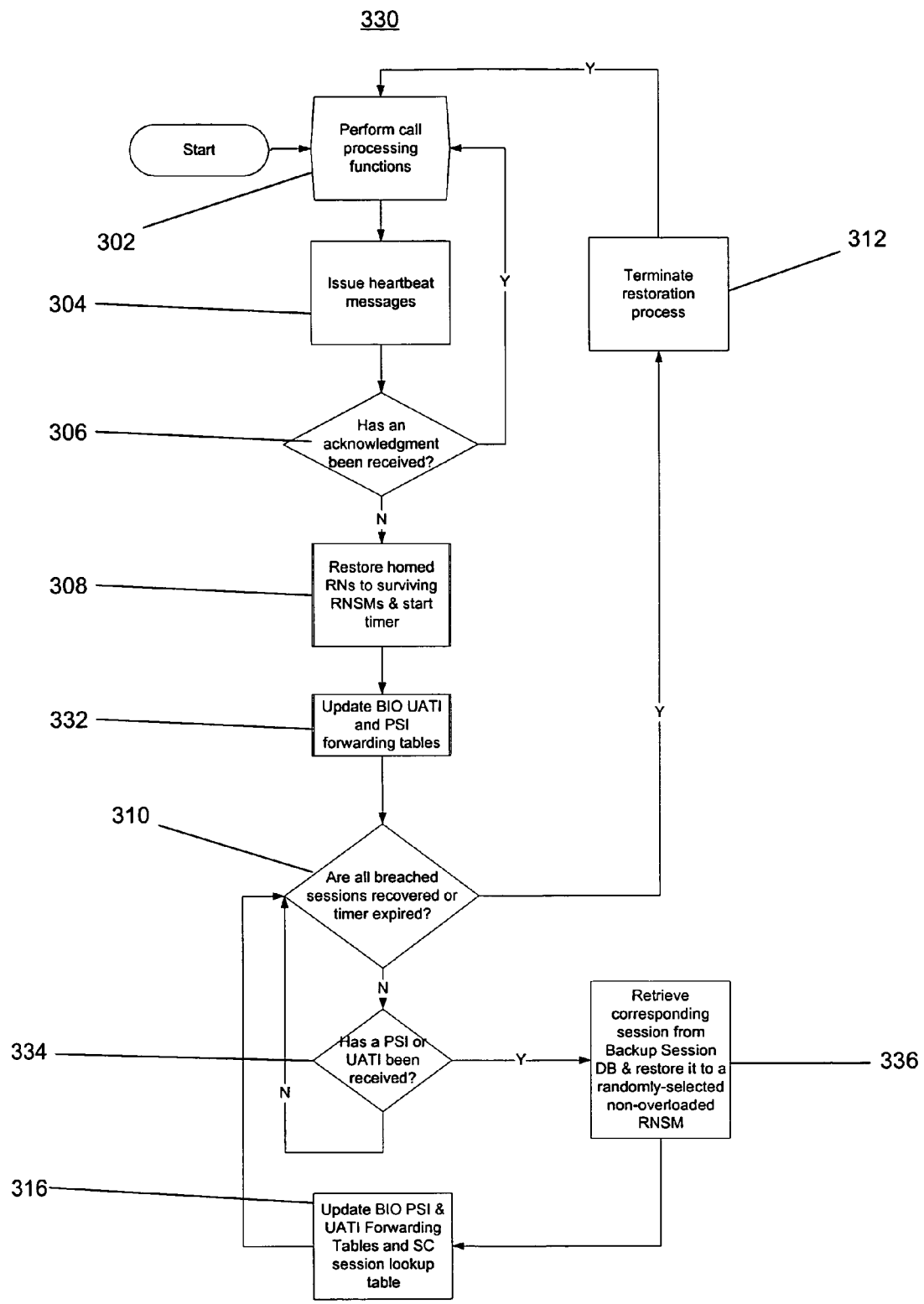
FIG. 7 illustrates the logic of reactive session restoration performed by the Protecting RNSM of FIG. 4.

FIG. 7 shows a process for reactive session restoration performed by a backup RNSM, as shown in FIG. 4. The protecting RNSM 46a executes the performing (302), issuing (304), determining (306), and restoring (308) processes described for the proactive restoration process 300 illustrated in FIG. 6. The backup RNSM then updates (332) the BIO's UATI and PSI forwarding tables so that messages intended for the faulty RNSM are routed to the backup RNSM. In some embodiments, the BIO's UATI and PSI forwarding tables are updated using a single message by previously configuring the BIO to know the backup RNSM for every active RNSM. The backup RNSM then waits for a packet with a UATI or PSI for a breached session to be received while continually checking (310) for timer expiration or completion of the session recovery process. Upon receipt (334) of a packet with such a UATI or PSI, the backup RNSM retrieves the corresponding session from its backup session database and restores (314) it to one of the working RNSMs in the RNC, including itself. In some embodiments, the backup RNSM randomly allocates individual sessions or groups of sessions to itself and the other RNSMs. If a particular working RNSM indicates that it is overloaded, the backup RNSM may not assign additional sessions to that RNSM, in order to avoid exacerbating the overload condition. As each session or group of sessions is restored, the backup RNSM updates (316) the UATI and PSI forwarding tables of the BIOs so that subsequent traffic destined for that session will be routed to the correct RNSM for that session. Upon determining (310) that either the timer has expired or that all of the breached sessions have been restored, the backup RNSM terminates (312) the restoration process, which includes deleting all unrecovered sessions. The backup RNSM also enters a non-protecting mode, where it is no longer sending heartbeat messages to other RNSMs.

Figure 8:
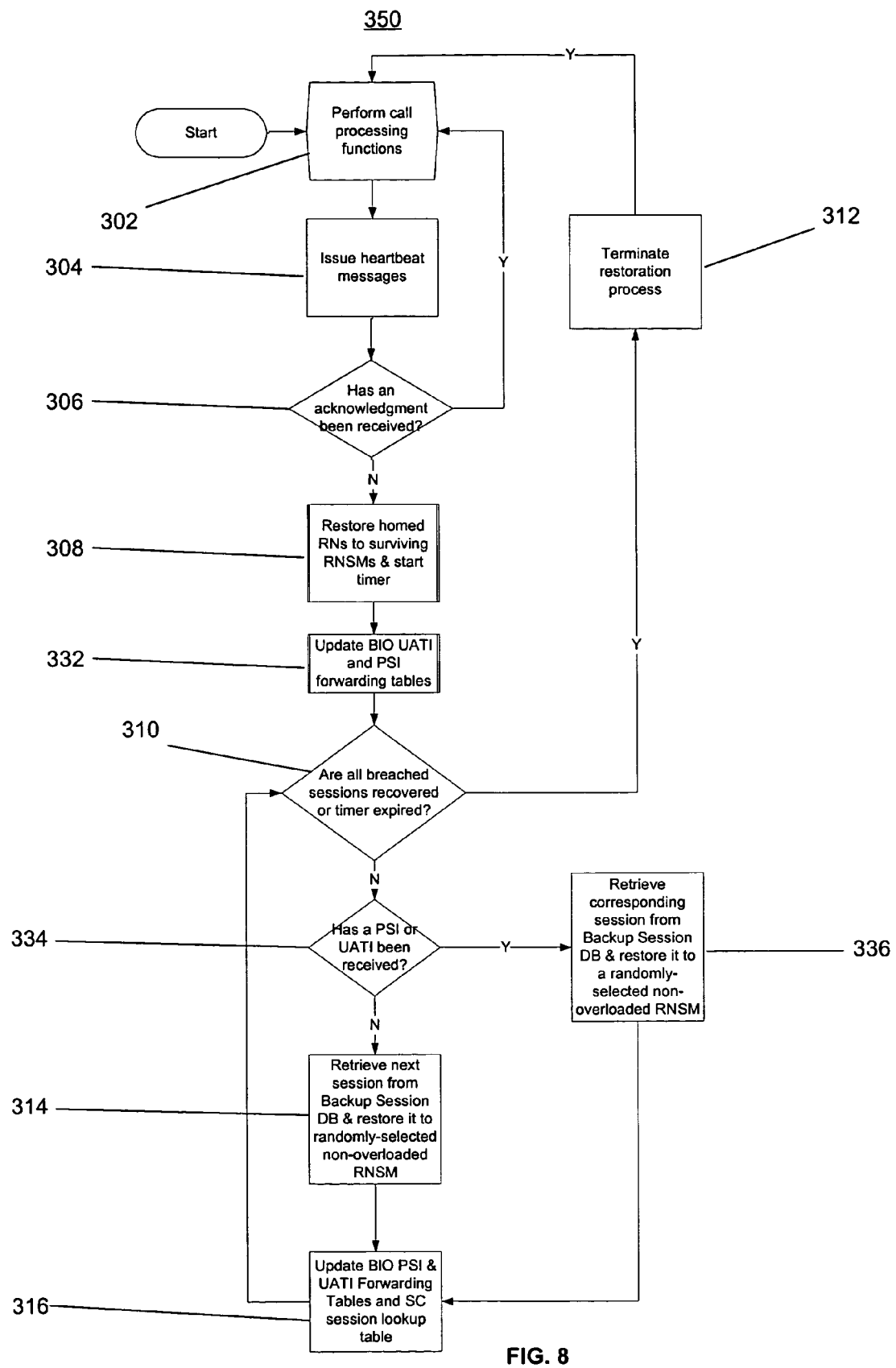
FIG. 8 illustrates the logic of combined proactive and reactive session restoration performed by the Protecting RNSM of FIG. 4.

FIG. 8 shows a process for combined reactive and proactive session restoration performed by a backup RNSM. The protecting RNSM 46a executes the performing (302), issuing (304), determining (306), and restoring (308) processes described for the proactive and reactive closure processes 300 and 330 illustrated in FIGS. 6 and 7. The backup RNSM then updates (332) the BIO's UATI and PSI forwarding tables so that messages intended for the faulty RNSM are routed to the backup RNSM. The backup RNSM determines if a UATI or PSI for a breached session has been received while continually checking (310) for timer expiration or completion of the session recovery process. Upon receipt (334) of a packet with such a UATI or PSI, the backup RNSM retrieves the sessions from its backup session database and restores them evenly to each of the working RNSMs in the RNC, including itself. If no such packet has been received, the backup RNSM retrieves (314) the next breached session or group of sessions from its backup session database and restores them evenly to each of the working RNSMs in the RNC, including itself. In some embodiments, the backup RNSM randomly allocates individual sessions or groups of sessions to itself and the other RNSMs. If a particular working RNSM indicates that it is overloaded, the backup RNSM may not assign additional sessions to that RNSM, in order to avoid exacerbating the overload condition. As each session or group of sessions is restored, the backup RNSM updates (316) the UATI and PSI forwarding tables of the BIOs so that subsequent traffic destined for that session will be routed properly. Upon determining (310) that either the timer has expired or that all of the breached sessions have been restored, the backup RNSM terminates (312) the restoration process, which includes deleting all unrecovered sessions. The backup RNSM also enters a non-protecting mode, where it is no longer sending heartbeat messages to other RNSMs. In this manner, session restoration proceeds in an orderly fashion, with an acceleration to the head of the processing queue of any sessions for which immediate service is requested by the PDSN 27 or an RN (e.g., RN 30a).

Session Closure

As described earlier, the 1x EV-DO protocol also permits repair of session breach by the closure of a breached session from the network side, resulting in an automatic re-establishment of the session by the AT.

As will be explained in more detail below, for session closure, the session database is preferably not a backup of all session information maintained by the respective RNSMs, but only includes information sufficient to generate and transmit close session messages to the ATs in the event of a RNSM failure. With reference to FIG. 2, if a protecting RNSM 46a receives an indication that a protected RNSM 46b may have failed, the protecting RNSM 46a will direct other RNSMs (e.g., RNSM 46c) to transmit close session messages to the effected ATs. For example, if the protecting RNSM 46a receives an indication that RNSM 46b has failed, it will use the information stored in the backup session database 67a to generate a close session message for AT 34b and assigns another RNSM (e.g., RNSM 46c) to transmit the close session message to AT 34b. When AT 34b receives the close session message, it will terminate its session with RNSM 46b and open a new session with one of the operational RNSMs.

The Base I/O (BIO) 42 receives data packets from the PDSN 27 and routes them to the appropriate RNSM for delivery to an AT. Upon notification of an RNSM failure, the protecting RNSM 46a directs the BIO 42 to flag the faulty RNSM to prevent the BIO 42 from sending any further data packets to the faulty RNSM when an application tries to contact a breached session. If the BIO 42 receives a data packet from the PDSN 27 that is addressed to a faulty RNSM 46b, the BIO 42 forwards the data packet to the RNSM 46a that was protecting the faulty RNSM 46b. The protecting RNSM 46a preferably saves the data packet or a subset of information contained within the data packet until a new session for the AT is established on another RNSM or until the new-session establishment procedure times out. Normally the protecting RNSM 46a will attempt to reestablish lost sessions according to their order in a queue; however if the protecting RNSM 46a receives an indication from the BIO 42 that an application is trying to contact a particular session in the queue, the protecting RNSM 46a will promote that session to the top of the queue and service that session immediately, as described for the combined proactive and reactive service order 170 shown in FIG. 5C. In this manner, the protecting RNSM 46a uses notification sent from the BIO 42 to prioritize the close session messages.

Referring to FIG. 3, the protecting RNSM 46a maintains a session database 66a that contains information for all sessions served by the faulty RNSM 46b. In this particular implementation, the session database 66a is accessed by protection-related RNSM processes via the Session Backup Manager 68a software module.

As shown in FIG. 9, the session database 66a stores the following information for each session 252:

(1) a Unicast Access Terminal Identifier (UATI) 254, which is an identification code that uniquely identifies an AT 34 when it is registered with the access network;

(2) a Hardware Identifier (HwID) 256, which is a unique and permanent identification code of the physical hardware of the AT 34;

(3) a PDSN/PCF Specific Identifier (PSI) 258, which is a unique identification assigned to each AT 34 that has established a session with the network to allow the PCF subsystem of the RNC and the PDSN to identify to each other the particular session referenced by a data transmission;

(4) a control channel cycle 260 identifying the periodic interval at which the AT monitors broadcast transmissions from the network when it does not have an active radio resource uniquely assigned to it;

(5) a set of AT sectors 262 that maps each AT 34 to the particular sectors that the AT was monitoring when it last sent a route update to the network 46; and (6) Flags 264 that indicate the occurrence of an RNSM failure.

To generate and transmit a close session message to an AT under the current 1x EV-DO protocol, the RNC maintains at least the AT's UATI, PSI, control channel cycle and last sectors received as part of a route update. The UATI is used to identify a particular AT when sending the close session message over the control channel. The Hardware Identifier is used to identify an AT in the session database so that the RNC can detect if a session no longer requires closure as it has already been closed and replaced with a new session by an AT-initiated connection attempt. The PSI identifies the session to close when a packet is received from the PDSN 27 destined to an AT whose session has been breached. The control channel cycle is used to transmit a close session message to the AT. The AT sectors are required to optimize the session closure process. If a large number of sessions are to be closed but the location of each AT is not known, the close session message for each AT must be sent over all sectors controlled by the RNC that contains the faulty RNSM. This consumes significant amounts of processing capacity and control channel bandwidth. Knowledge of which sectors from which the AT last reported pilots allows targeting of the close session message to a smaller number of sectors for each AT. The information stored in the session database 66 is sufficient to reestablish lost sessions resulting from an RNSM failure.

Referring again to FIG. 3, the RNSM, e.g., RNSM 46a, includes a call control process 72 that monitors the status of each AT being served by the RNSM. As the status of ATs change, the call control 72 updates the Active Session Database 66a. The updates trigger the Session Backup Manager 68 to replicate the whole or part of the recently updated session onto the backup RNSM if the change to the Active Session Database results in the session entering a "syncable" state that is different from the last state that was updated to the backup RNSM. For example, if a new session is created or deleted by an AT, the call control process 72 creates or deletes a corresponding session in the session database 66a. The RNC 28 exchanges data with the core IP network 26 through an Radio-Packet (R-P) interface that carries user traffic. A single user traffic connection within this interface is an A10 as defined in the 1x EV-DO Standard. If an A10 interface is created or deleted for a session, the call control 72 updates the session database 66a which triggers the Session Backup Manager 68 to update the Backup Session Database 67 on the backup RNSM. If an AT 34 sends a route update including radio sectors that are different from the set of sectors which it included in its last route update, or changes the control channel cycle, the call control 72 updates the session database 66a. As the Session Backup Manager 68 detects update messages from the call control processes, it updates the backup session database 67 accordingly. The Session Backup Manager 68 also maintains the timers required for managing the session close and retry processes.

An RNSM communicates with the PDSN 27 through the Packet Control Function (PCF) 64. The PCF 64 controls the transmission of packets between the RNC 28 and the PDSN 27. The PCF 64 interfaces to the PDSN 27 through an A10 interface that carries user traffic between the PCF 64 and the PDSN 27. The RNC 28 opens an A10 for each session created for an AT 34. Upon detection of an RNSM failure, the PCF is configured to instruct the PDSN 27 to stop accounting for the activity of the A10s belonging to the faulty RNSM 46 but leave the effected A10s intact. This instruction can be accomplished by transmitting an ActiveStop message 76 to the PDSN 27. This step functions to maintain accurate user billing information in the core IP network as the ActiveStop command is a notification that billable user activity has ceased. Because the PCF 64 is not closing the A10s, they will be kept alive indefinitely if no other action is taken. Therefore, the A10s are closed only after a session is closed or when the entire session closure process has timed out. They are reopened when a new session is created by an AT-initiated connection attempt. The Session Backup Manager 68 is also configured to notify the BIO 42 of the affected A10s by, for example, sending the BIO 42 a flag notification to label the A10 entries belonging to the faulty RNSM (e.g., RNSM 46a).

The BIO 42 maintains a PSI table 62 that maps ATs to RNSMs and thus allows the BIO to route data packets bound for an AT to the appropriate RNSM. A PSI table 62 is a lookup structure indexed by PSI that returns the identity of the RNSM where the session addressed by that PSI is located.

The BIO also includes a Fast Path component 60 that facilitates generation of close session messaging upon detection of an RNSM failure. The fast path component receives notification of faulty RNSMs, and, in response, updates the PSI forwarding table 62, where the affected sessions are flagged. The fast path component 60 also sends received data packets to the Session Backup Manager 68 of the protecting RNSM 46a when it receives a packet from the core network labeled with a PSI whose corresponding RNSM is flagged for session closure in the PSI table. The Session Backup Manager 68 issues the GenerateSessionClose message, updated with the information from the Session Database 80 to a chosen RNSM 46 which then signals the AT 34 to close the session. When the BIO 42 receives a subsequent data packet 78 destined to a faulty RNSM 46, the BIO will discard the packet 78 if it has already initiated session closure.

When an RNSM fails, the sessions supported by the faulty RNSM are entered into a queue. The RNC can process close session messages for the sessions waiting in the queue in several ways. For example, as shown in FIG. 5A, the RNC 28 executes close session messaging using a proactive process 10, in which breached sessions are serviced immediately upon awareness of an RNSM failure according to their order in the queue 200. If a user's session is closed and reestablished before any applications attempt to reach the session, the user will never notice that his session was breached. However, if an application attempts to reach a breached session, that application must wait until all preceding queued sessions have been serviced before that particular session is reestablished. For example, suppose an application attempts to contact the fifth session in the queue 200. The application must wait for the preceding sessions to be processed before the fifth session can be reestablished, regardless of whether or not the preceding sessions require immediate service. If the fifth session is not reestablished before the application times out, the application will give up and terminate. Thus if many sessions are waiting to be closed, some users may find that an application tried to contact their sessions but could not because their sessions were at the end of a queue of sessions to be closed.

In a reactive session closure process, the RNC 28 reduces the frequency of application timeouts by transmitting close session messages to only those ATs that an application tries to reach. An example of a reactive session closure process 150 is seen in FIG. 5B. The fifth session in the queue 200 is highlighted as urgent 204 to indicate that an application is attempting to reach that session. All other queued sessions are marked as non-urgent 202. The fifth session is serviced immediately while each of the remaining queued sessions must wait until an applications attempts contact. If after a predetermined time, a queued session is not contacted by an application, the RNC times that session out and deletes it from the queue.

Because the reactive closure process prioritizes urgent sessions above non-urgent sessions, application timeouts are less likely to occur during reactive session closure than during proactive session closure. Furthermore, reactive session closure conserves processing resources that would have been required to close non-urgent sessions. On the other hand, reactive session closure causes all users to experience a brief period of unreachability between the time at which network-initiated traffic arrived for them and the time at which it could be delivered.

A third method of session closure integrates the proactive and reactive processes to form a combined proactive and reactive process. For example, as shown in FIG. 5C, a combined proactive and reactive process 170 services non-urgent sessions 202 according their order in the queue 200. If a session becomes urgent 204, the process 170 promotes 208 that session to the top of the queue 200 for immediate servicing. The advantage of the combined scheme 170 is that the closure process can be paced so that it does not significantly disrupt normal system operation yet can be facilitated immediately if session closure becomes urgent.

Figure 10:
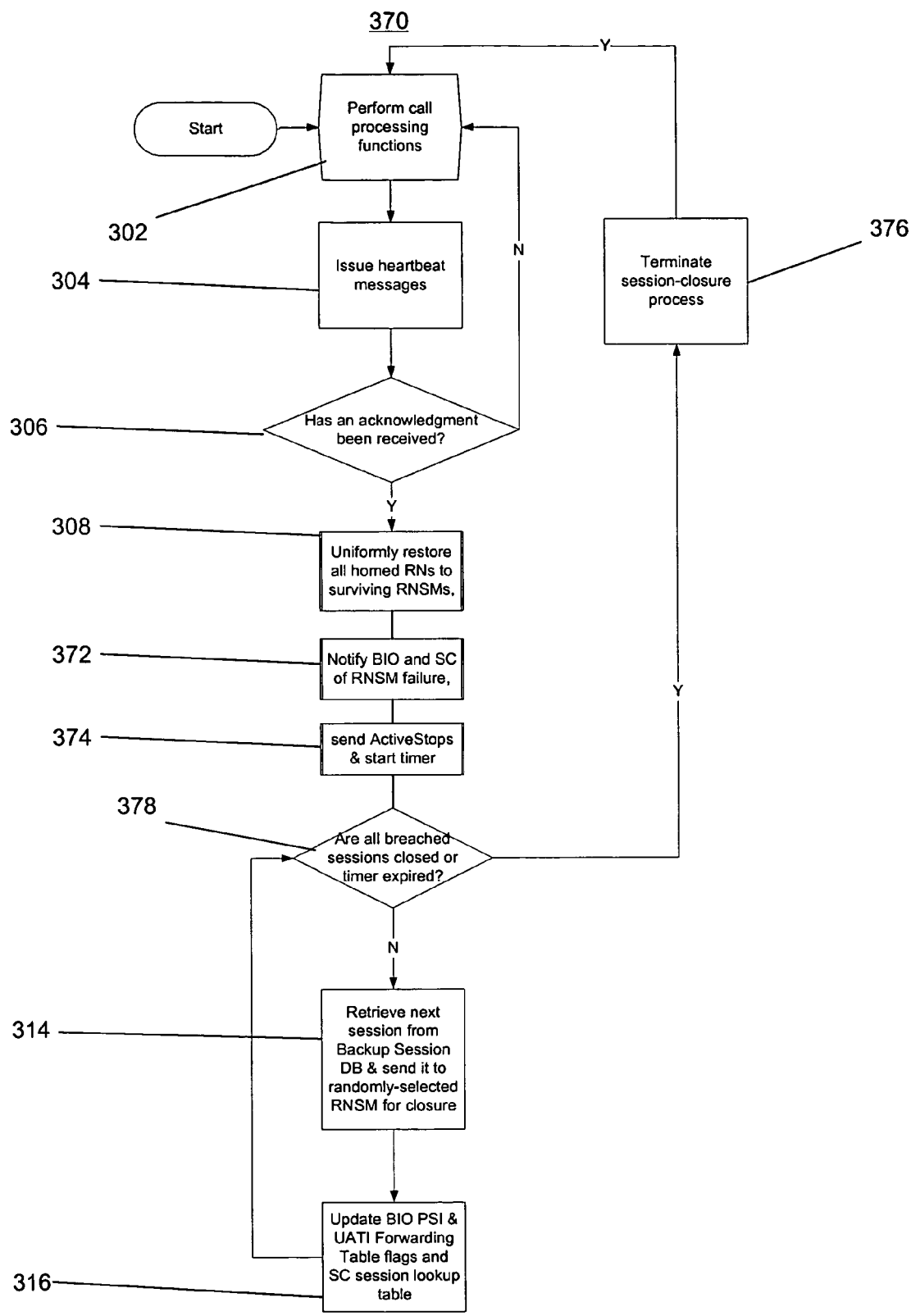
FIG. 10 illustrates the logic of proactive session closure performed by the Protecting RNSM of FIG. 4.

FIG. 10 shows a process 370 for performing proactive session closure. The protecting RNSM 46a continually issues (304) heartbeat messages to the active RNSM 46b while performing normal call processing functions. If the active RNSM 46b is working properly, it sends an acknowledgement of the heartbeat messages to the protecting RNSM 46a. If the protecting RNSM 46a receives (306) an acknowledgement from the active RNSM 46b, it continues to perform (302) normal call processing functions. If the protecting RNSM 46a does not receive an acknowledgement from the active RNSM 46b, the active RNSM 46b is the active RNSM is faulty and its sessions are breached. Thus, the protecting RNSM 46a begins the session closure process. Immediately after an RNSM failure, the RNSM 46b reboots. Upon reboot, the RNSM 46b notifies the SC 40 that it has booted, allowing the SC 40 to begin using it for new sessions.

Upon the indication of an RNSM failure, the protecting RNSM 46a triggers the rehoming 308 of all RNs that were served by the faulty RNSM 46b. The RNSM 46a sends (372) a notification of failure of RNSM 46b to the BIO 42 to initiate a session closure process described in FIG. 13. Upon receiving the notification of failure, the BIO flags all sessions being served by the faulty RNSM 46b. The protecting RNSM 46a also notifies (372) the SC 40 that the RNSM 46b has failed. Upon notification, the SC 40 updates its Session Lookup Database 70 to reflect that the session's existence is now known on the protecting RNSM 46a. Prior to the failure of RNSM 46b, the protecting RNSM 46a had been continually storing a subset of the session information for all sessions in the RNC as given to it by the Session Backup Manager 68a. The session information is later used to reconstitute the breached session. The PCF 64 sends an ActiveStop command 76 to the PDSN 27 (374) on behalf of each breached session and starts a timer (374). The timer may be used to terminate the session closure process in situations where session closure may not terminate normally. The ActiveStop command 76 instructs the PDSN 27 to stop billing the A10s for the sessions that were active but to leave those same A10s intact. When a session is to be closed, the protecting RNSM 46a assigns a flagged session to a working RNSM (e.g., RNSM 46c) and sends the session information to the working RNSM. The protecting RNSM 46a sends the session information to a selected working RNSM (314) instructing the working RNSM to issue a session closure command (i.e., a close session message) to the AT 34. If the AT 34 requests a new session before the timeout occurs, the RNC 28 assigns the AT 34 to a working RNSM thus reestablishing the breached session. When the working RNSM registers the new session with the SessionDB Lookup App 71 on the SC 40, the Session DB Lookup App 71 determines that the session is a duplicate because it has the same HardwareID as an existing session. The Session DB Lookup App 71 responds to the working RNSM with an acknowledgement of the registered session and notification of the RNSM on which the duplicate resides—in this case, the protecting RNSM 46a. At this time, the working RNSM sends a message to the protecting RNSM 46a indicating that the session has been closed and identifying the session by its hardware ID. The protecting RNSM 46a then deletes that session from its list of sessions awaiting closure. However, if the AT 34 does not request a new session before the timeout, the protecting RNSM 46a deletes the timer and all saved session information for sessions that have not already been closed. The protecting RNSM 46a determines (378) whether all breached sessions, served by the faulty RNSM 46b, have been reassigned or whether the entire session closure timeout has expired. If the determination (378) is negative, the protecting RNSM 46a retrieves (314) the next session from its backup session database. In some embodiments, the backup RNSM randomly allocates individual sessions or groups of sessions to itself and the other RNSMs. If a particular working RNSM indicates that it is overloaded, the backup RNSM may not assign additional sessions to that RNSM, in order to avoid exacerbating the overload condition. As each session or group of sessions is closed, the backup RNSM updates (316) the UATI and PSI forwarding tables of the BIOs so that subsequent traffic destined for the session will be routed to the working RNSM to which the session is assigned for closure. Upon determining (378) that either the timer has expired or that all of the breached sessions have been closed, the protecting RNSM 46a terminates (376) the closure process, which includes deleting the timer and all saved session information for sessions that have not already been closed. The protecting RNSM 46a enters a non-protecting mode, in which it no longer sends heartbeat messages to other RNSMs.

Figure 11:
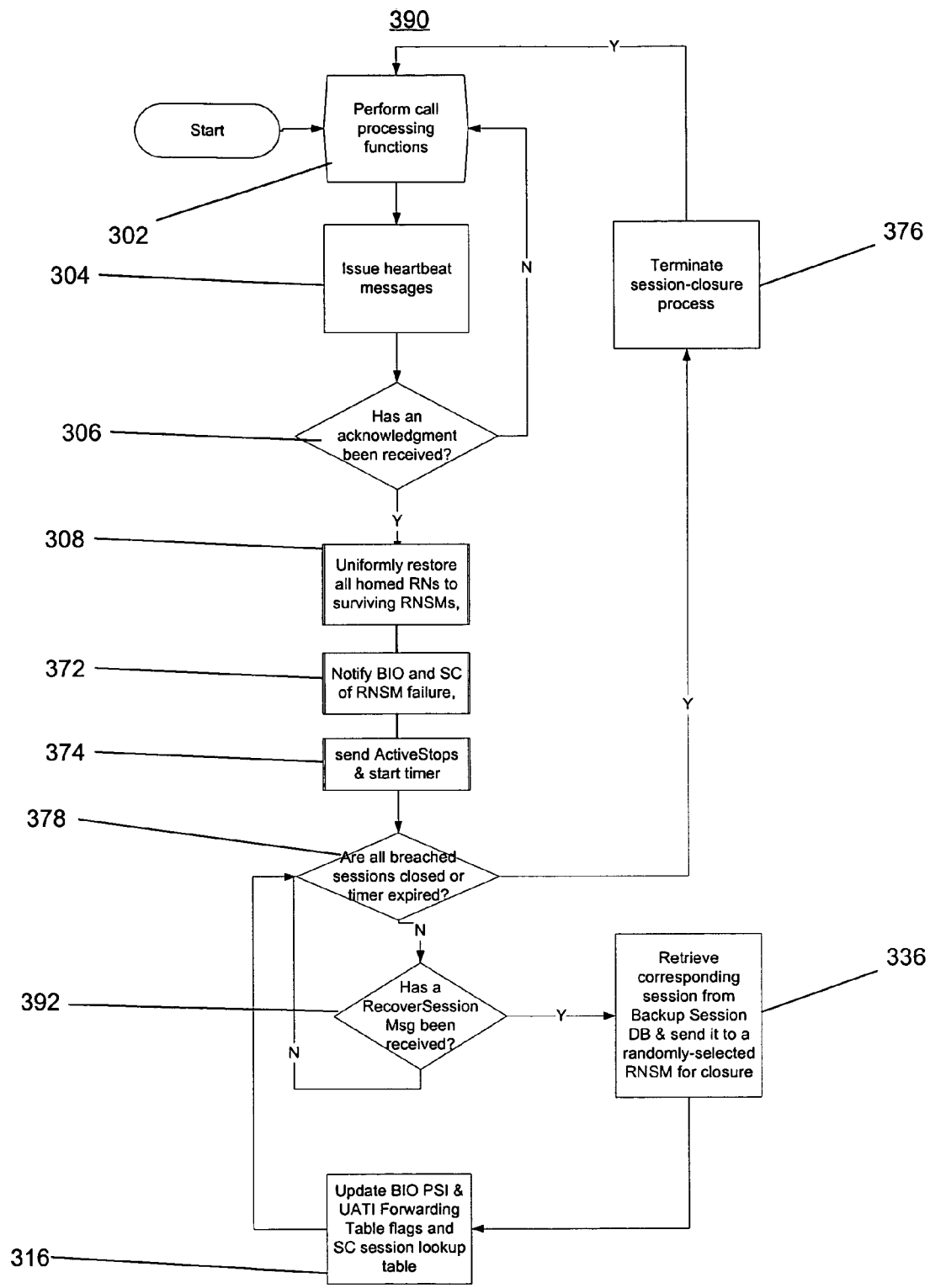
FIG. 11 illustrates the logic of reactive session closure performed by the Protecting RNSM of FIG. 4.

To reduce the impact of the recovery process on normal service delivery, a reactive session closure process 390 is implemented. FIG. 11 illustrates a reactive session closure process 390 performed by the protecting RNSM 46a. The protecting RNSM executes the performing (302), issuing (304), determining (306), notifying (372), and sending (374) processes described for the proactive closure process 370 illustrated in FIG. 10.

Figure 13:
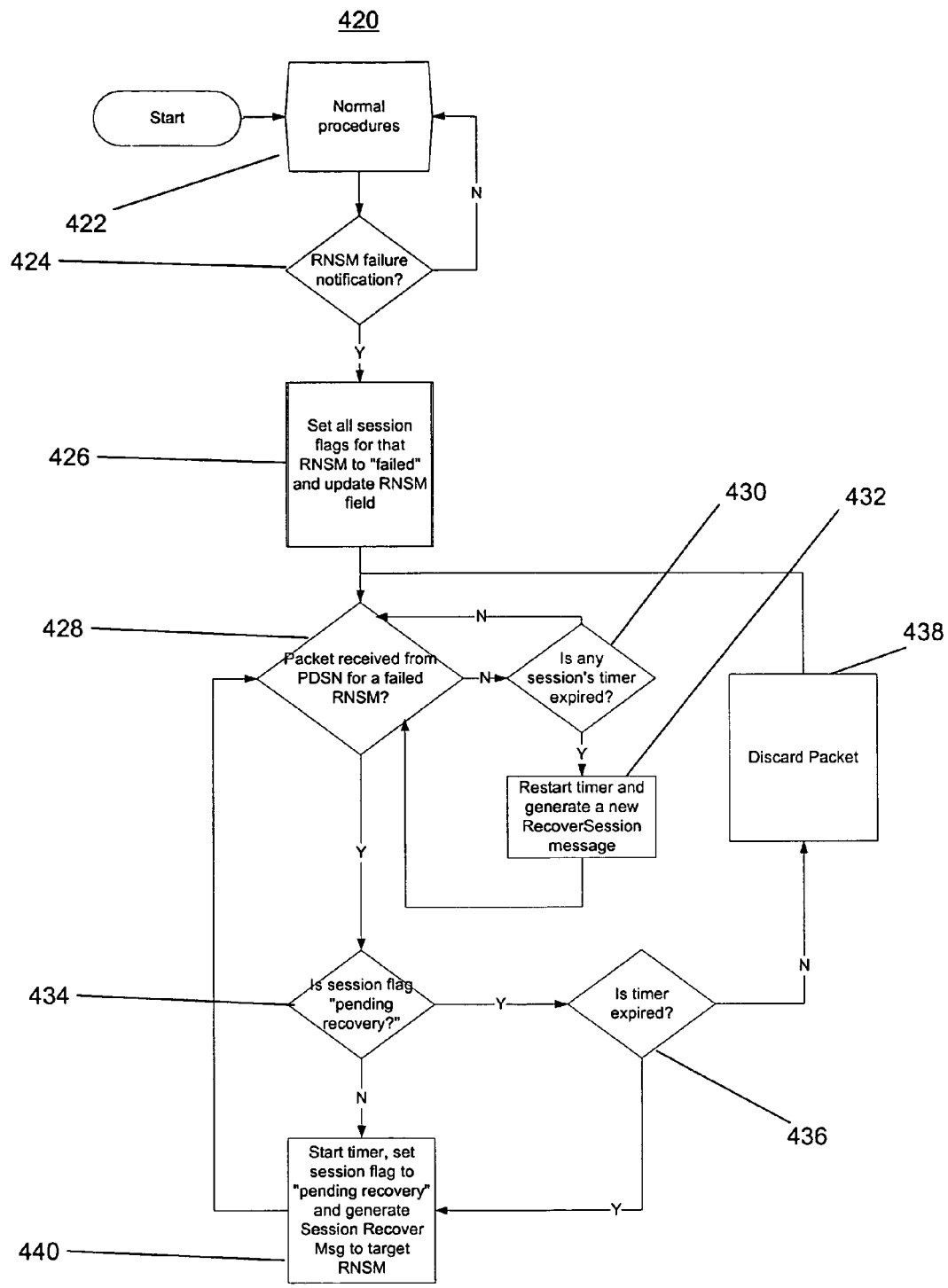
FIG. 13 illustrates the logic of session closure functions performed by the Base I/O (BIO) of FIG. 2.

The protecting RNSM 46a sends the flagged session information to the BIO 42 to initiate a session closure process described in FIG. 13. Instead of initiating session closure immediately for every flagged session as was done in the proactive scheme 370, the protecting RNSM 46a waits for an application to attempt contact with the session from the core network side before initiating a session closure. The protecting RNSM 46a first starts a timer to limit the duration of time during which it will attempt to close sessions reactively (374). The BIO 42 notifies the protecting RNSM 46a that an application is attempting contact with a particular breached session by sending the protecting RNSM 46a a RecoverSession message that identifies the breached session. The RNSM 46a determines (392) whether a RecoverSession message has been received. If no RecoverSession message is received, the protecting RNSM 46a resumes its process of waiting (392) for RecoverSession messages from the BIO 42 until a timeout occurs After receiving the RecoverSession message, the protecting RNSM 46a assigns the session identified by the BIO 42 to a working RNSM. The protecting RNSM 46a retrieves the session identified by the BIO 42 from the Backup Session DB 67a and sends (336) the saved session information to the working RNSM indicating that the session is to be closed. The working RNSM sends a close session message to the AT 34. If the AT 34 requests a new session before the timeout occurs, the RNC 28 assigns the AT 34 to a working RNSM thus reestablishing the breached session. When the working RNSM registers the new session with the SessionDB Lookup App 71 on the SC 40, the Session DB Lookup App 71 determines that the session is a duplicate because it has the same HardwareID as an existing session. The Session DB Lookup App 71 responds to the working RNSM with an acknowledgement of the registered session and notification of the RNSM on which the duplicate resides—in this case, the protecting RNSM 46a. At this time, the working RNSM sends a message to the protecting RNSM 46a indicating that the session has been closed and identifying the session by its hardware ID. The protecting RNSM then deletes that session from its list of sessions awaiting closure. However, if the AT 34 does not request a new session before the timeout, the protecting RNSM 46a deletes the timer and the saved session information. The protecting RNSM 46a determines (378) whether all breached sessions, served by the faulty RNSM 46b, have been reassigned or whether the entire session closure timeout has expired. If the determination (378) is negative, the protecting RNSM 46a waits for another RecoverSession message 80 from the BIO 42 (392) before initiating another session closure. The protecting RNSM 46a retrieves the session identified by the BIO 42 from the Backup Session DB 67a and sends (336) the saved session information to the working RNSM indicating that it is to be closed and starts a timer. The working RNSM sends a close session message to the AT 34. As each session or group of sessions is closed, the protecting RNSM 46a updates (316) the UATI and PSI forwarding tables of the BIOs so that subsequent traffic destined for the session will be routed to the working RNSM to which the session is assigned for closure. Upon determining (378) that either the timer has expired or that all of the breached sessions have been closed, the protecting RNSM 46a terminates (376) the closure process, which includes deleting the timer and all saved session information for sessions that have not already been closed. The protecting RNSM 46a enters a non-protecting mode, in which it no longer sends heartbeat messages to other RNSMs.

Figure 12:
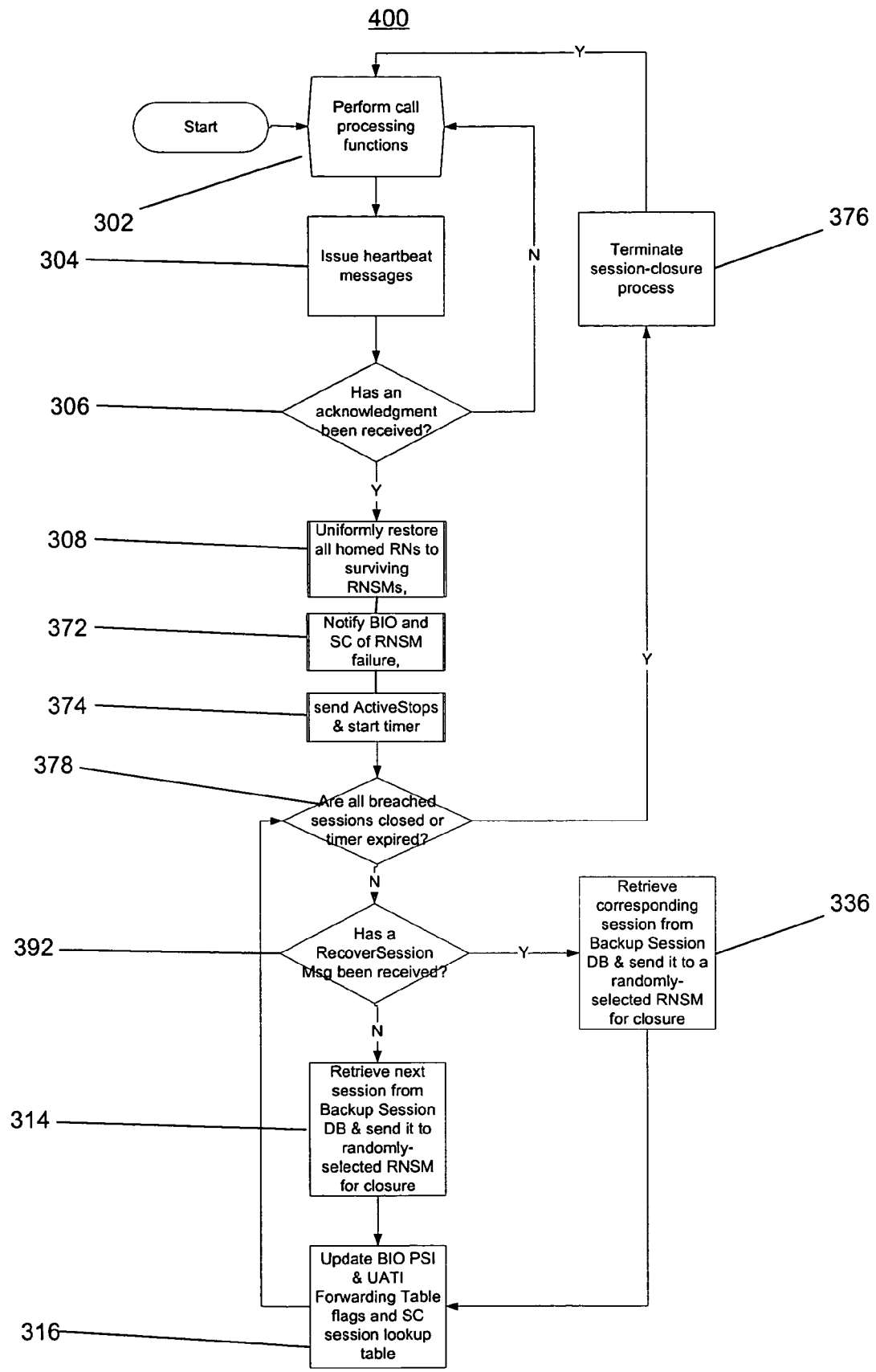
FIG. 12 illustrates the logic of combined proactive and reactive session closure performed by the Protecting RNSM of FIG. 4.

FIG. 12 illustrates a combined proactive and reactive session closure scheme 400 that integrates the proactive 370 and the reactive 390 session closure schemes described in FIG. 10 and FIG. 11, respectively. Both the reactive session closure process 390 of FIG. 11 and the combined closure process 400 of FIG. 12 use the RecoverSession message sent from the BIO 42 to prioritize close session messaging. The protecting RNSM 46a executes the performing (302), issuing (304), determining (306), notifying (372), and sending (374) processes described for the proactive and reactive closure process 370 and 390 illustrated in FIGS. 10 and 11.

In the combined process 400, the protecting RNSM 46a determines (378) whether all breached sessions in queue 200 have been reassigned or whether the entire session closure timeout has expired. If the determination (378) is negative, the protecting RNSM 46a determines (392) whether a RecoverSession message 80 from the BIO 42 has been received.

If the protecting RNSM 46a receives a RecoverSession message from the BIO 42, the protecting RNSM 46a will immediately process (336) the session identified by the BIO 42, thus effectively promoting that session to the front of the queue 200. If the protecting RNSM 46a does not receive a RecoverSession message from the BIO 42, the protecting RNSM 46a will process (314) the sessions according to their order in the queue 200 at a user-configurable rate. The rate may be selected to optimize a trade-off between the speed at which sessions are closed and the processing power required to close the sessions.

As each session or group of sessions is closed, the protecting RNSM 46a updates (316) the UATI and PSI forwarding tables of the BIOs so that subsequent traffic destined for the session will be routed to the working RNSM to which the session is assigned for closure. Upon determining (378) that either the timer has expired or that all of the breached sessions have been closed, the protecting RNSM 46a terminates (376) the closure process, which includes deleting the timer and all saved session information for sessions that have not already been closed. The protecting RNSM 46a enters a non-protecting mode, in which it no longer sends heartbeat messages to other RNSMs.

Referring to FIG. 13, the close session messaging process 420 performed by the BIO 42 is shown. While performing (422) normal procedures, the BIO 42 continually determines (424) whether a RNSM failure notification has been received from a protecting RNSM 46a. The BIO 42 flags (426) all session entries in its PSI table 62 and its UATI table 63 for the faulty RNSM 46b and updates the location of the sessions in the session entries to point to the protecting RNSM 46a. The BIO 42 receives data packets 78 from the PDSN 27 and determines (428) whether the packets are directed toward a faulty RNSM. If the packets are directed toward a faulty RNSM, the BIO 42 determines (434) whether the session, to which the packets belong, are flagged as "pending recovery." If the session is not flagged, the BIO 42 flags (440) the session as "pending recovery," starts a timer, and sends a Recover-Session message to the protecting RNSM 46a. The Recover-Session message notifies the protecting RNSM 46a that an application has attempted to contact a breached session. The BIO 42 determines (436) whether the timer has expired. Subsequent packets received for the flagged sessions while the timer is not yet expired are discarded (438). If the timer has expired, a new RecoverSession is sent (440) to the protecting RNSM 46a and the timer is restarted. If the BIO 42 determines (428) that a received packet is not directed toward a faulty RNSM, the BIO 42 determines (430) if the timers for any other breached sessions that are pending recovery have expired. If the timers have not expired, the BIO 42 continues receiving packets and determining (428) whether they are directed toward faulty RNSMs. If a timer for a session has expired, the BIO 42 restarts the timer and generates (432) a new RecoverSession message for the session.

The RNC 28 could be implemented by a number of different hardware configurations. One possible configuration is a dedicated chassis containing multiple processing cards, where each card performs the functions of either the SC 40, the BIO 42, or the RNSM (e.g., RNSM 46a). In a preferred embodiment, the processing card is a Compact-PCI or Advanced TeleCommunications Architecture (A-TCA) Card containing non-volatile RAM, flash memory, and a flash disk. A second configuration is a blade server. A blade server consists of a chassis containing multiple cards where each card is equivalent to a complete single-board computer, except that common resources such as hard disk drives and power supplies are shared between all the cards. The RNC 28 could also be implemented on standalone servers arranged as a collection of independent computers in which each computer plays the role of an RNC 28. In this standalone-server configuration, each computer consolidates the functions of the SC 40, the BIO 42, and the RNSM (e.g., RNSM 46a) into a single processor. An alternate embodiment of the standalone server model utilizes each computer as either an SC, RNSM or BIO. Another configuration for the RNC 28 could be an integrated system containing embedded processors that perform the functions of the SC 40, the BIO 42, or the RNSM (e.g., RNSM 46a). A further configuration is an application-specific integrated circuit (ASIC) in which all functions of the RNC 28 are performed by a single chip. The PCF 64 could also be implemented as a virtual PCF and reside on all RNSMs 46 simultaneously or on a given RNSM (e.g., RNSM 46a) with the ability to be relocated to another RNSM (e.g., RNSM 46b).

Other embodiments are within the scope of the following claims. For example, the steps described in FIG. 6, FIG. 7, FIG. 8, FIG. 10, FIG. 11, FIG. 12 and FIG. 13 could be performed in an order that is different than the ordering shown in the figures.

What is claimed is:
1. A method performed by a network device, comprising: receiving, session information used to pass session data to an access terminal, wherein the session information is associated with a session established on the access terminal;
saving a minimum portion of the session information for reestablishing the session, the minimum portion of the session information comprising (i) a unicast access terminal identifier, a hardware identifier, and a packet data serving node identifier, and (ii) a control channel cycle identifying a periodic window of time in which the access terminal is configured to receive a close session message; and
in response to a degradation of the session, triggering a reestablishment of the session using the minimum portion of the session information,
wherein triggering the reestablishment of the session comprises:
determining that a present time corresponds to the periodic window of time in which the access terminal is configured to receive the close session message; and
causing the close session message to be sent to the access terminal, the close session message causing the access terminal to (i) terminate the session established on the access terminal, and (ii) reestablish the session on the access terminal using the minimum portion of the session information.

2. The method of claim 1, wherein the degradation of the session comprises a cessation of the session.

3. The method of claim 1, wherein the network device comprises a first network device, the session is established between the access terminal and a second network device, and wherein the method further comprises:
detecting the degradation of the session by detecting a state of the second network device.

4. The method of claim 3, wherein the state comprises a failure state.

5. The method of claim 1, wherein the triggering complies with a 1 x Evolution-Data Optimized protocol.

6. The method of claim 1, wherein the close session message is sent following detection of the degradation of the session.

7. The method of claim 1, wherein the close session message is sent after receiving a request to transmit data to the access terminal.

8. The method of claim 1, wherein the network device comprises a first network device, the session is reestablished with a second network device, and wherein the reestablishment of the session is triggered based on a load state of the second network device.

9. The method of claim 1, wherein the access terminal comprises a first access terminal, and wherein the method further comprises:
placing data for one or more degraded sessions in a queue configured to transmit the close session message;
receiving a request to transmit data to a second access terminal associated with a selected, degraded session; and
following receipt of the request:
moving data for the selected, degraded session up in the queue.

10. The method of claim 9, wherein the one or more degraded sessions comprise one or more breached sessions.

11. The method of claim 1, wherein the access terminal comprises at least one of: a cellular telephone, a personal data assistant, and a laptop computer.

12. The method of claim 1, further comprising:
retrieving a timer comprising a predefined period of time;

determining that the access terminal has failed to request to open a new session, after the predefined period of time has elapsed; and
deleting the minimum portion of the session information for the session.

13. The method of claim 1, wherein the network device comprises a first network device, and wherein the method further comprises:
reestablishing the session between the access terminal and a second network device.

14. The method of claim 1, wherein the session information is saved in a data repository on the network device.

15. The method of claim 14, wherein the network device comprises a first network device, and wherein the close session message is generated by a second network device.

16. The method of claim 15, wherein the close session message is transmitted to the access terminal by the second network device.

17. The method of claim 16, wherein the session comprises a first session, and wherein the method further comprises:
establishing a second session on the access terminal; and
saving a minimum portion of the second session information to the network device, wherein the minimum portion of the second session information is used to reestablish the second on the access terminal.

18. The method of claim 1, further comprising:
generating, based on the minimum portion of the session information, the close session message for the access terminal for the session.

19. The method of claim 1, wherein the session comprises a first session and the access terminal comprises a first access terminal, and wherein the method further comprises:
placing data for the first session in a queue for reestablishment of the first session;
placing data for a second session in the queue for reestablishment of the second session, wherein the second session is prioritized below the first session in the queue;
receiving a request to transmit data to a second access terminal associated with the second session; and
promoting the data for the second session above the data for the first session in the queue, in response to receiving the request to transmit data.

20. The method of claim 19, further comprising:
monitoring a period of time that the data for the first session has spent in the queue; and
deleting the data for the first session from the queue, when the period of time that the data for the first session has spent in the queue exceeds a predetermined time period.

21. The method of claim 1, wherein the network device comprises a first network device, wherein the session is established between the access terminal and a second network device, and wherein the method further comprises:
receiving data bound for the second network device, after the degradation of the session; and
saving the data until the session is reestablished on the access terminal.

22. A system comprising:
a network device; and
one or more machine-readable media configured to store instructions that are executable by the network device to perform functions comprising:
receiving session information that is used to pass session data to an access terminal, wherein the session information is associated with a session established on the access terminal;
saving a minimum portion of the session information for reestablishing the session, the minimum portion of the session information comprising (i) a unicast access terminal identifier, a hardware identifier, and a packet data serving node identifier, and (ii) a control channel cycle identifying a periodic window of time in which the access terminal is configured to receive a close session message;
in response to a degradation of the session, triggering a reestablishment of the session using the minimum portion of the session information,
wherein triggering the reestablishment of the session comprises:
determining that a present time corresponds to the periodic window of time in which the access terminal is configured to receive the close session message; and causing the close session message to be sent to the access terminal, the close session message causing the access terminal to (i) terminate the session established on the access terminal, and (ii) reestablish the session on the access terminal using the minimum portion of the session information.

23. The system of claim 22, wherein the degradation of the session comprises a termination of the session.

24. The system of claim 22, wherein the network device is configured to comply with a 1x Evolution-Data Optimized protocol.

25. The system of claim 22, wherein the close session message is transmitted after detection of the degradation of the session on the access terminal.

26. The system of claim 25, wherein the degradation of the session comprises a cessation of the session.

27. The system of claim 22, the close session message is transmitted to the access terminal after the network device receives a request to transmit data to the access terminal.

28. The system of claim 22, wherein the access terminal comprises a first access terminal, and wherein the functions further comprise:
generating a queue configured to transmit the close session message, with data for one or more degraded sessions being placed in the queue;
receiving a notification of a request to transmit data to a second access terminal associated with at least one of the one or more degraded sessions; and
moving, in response to the notification, data for the at least one of the one or more degraded sessions to a higher entry in the queue.

29. The system of claim 28, wherein the one or more degraded sessions comprise one or more breached sessions.

30. The system of claim 22, wherein the network device comprises one or more of random access memory, flash memory, and disk memory.

31. The system of claim 22, wherein the network device comprises a first network device is configured to establish a communication with a second network device.

32. The system of claim 22, wherein the network device comprises a first network device, wherein the session is established between the access terminal and a second network device, and wherein the functions further comprise:
receiving data bound for the second network device after the degradation of the session and
saving the data until the session is reestablished on the access terminal.

33. The system of claim 22, wherein the network device comprises a first network device, the session is established between the access terminal and a second network device, and wherein the functions further comprise:

detecting the degradation of the session by detecting a state of the second network device.

34. The system of claim 33, wherein the state comprises a failure state.

35. The system of claim 22, wherein the functions further comprise: retrieving a timer comprising a predefined period of time;
determining that the access terminal has failed to request to open a new session, after the predefined period of time has elapsed; and
deleting the minimum portion of the session information for the session.

36. A non-transitory computer readable storage medium having instructions stored thereon, executed by a processor of a first network device for:
receiving session information used to pass session data to an access terminal, wherein the session information is associated with a session established on the access terminal;
saving a minimum portion of the session information for reestablishing the session, the minimum portion of the session information comprising (i) a unicast access terminal identifier, a hardware identifier, and a packet data serving node identifier, and (ii) a control channel cycle identifying a periodic window of time in which the access terminal is configured to receive a close session message; and
in response to a degradation of the session, triggering a reestablishment of the session using the minimum portion of the session information,
wherein triggering the reestablishment of the session comprises
determining that a present time corresponds to the periodic window of time in which the access terminal is configured to receive the close session message; and
causing the close session message to be transmitted to the access terminal, the close session message causing the access terminal to (i) terminate the session established on the access terminal and (ii) reestablish the session on the access terminal using the minimum portion of the session information.

37. The non-transitory computer readable storage medium of claim 36, wherein the network device is configured to communicate using a 1 x Evolution-Data Optimized protocol.

38. The non-transitory computer readable storage medium of claim 36, wherein the network device comprises a first network device, the session is reestablished with a second network device, and wherein the reestablishment of the session is triggered based on a load state of the second network device.

39. The computer readable storage medium of claim 36, wherein the session comprises a first session, the access terminal comprises a first access terminal, and wherein the functions further comprise:
placing data for the first session in a queue for reestablishment of the first session;
placing data for a second session in the queue for reestablishment of the second session, wherein the second session is prioritized below the first session in the queue;
receiving a request to transmit data to a second access terminal associated with the second session; and
promoting the data for the second session above the data for the first session in the queue, in response to receiving the request to transmit data.

40. The non-transitory computer readable storage medium of claim 39, wherein the functions further comprise:
triggering reestablishment of the first session, after triggering reestablishment of the second session.

41. The non-transitory computer readable storage medium of claim 36, wherein the access terminal comprises a first access terminal, and wherein the functions further:
receiving a request to transmit data to a second access terminal associated with the session; and
after receiving the request to transmit data:
triggering reestablishment of the session on the second access terminal.

42. The non-transitory computer readable storage medium of claim 36, wherein the network device comprises a first network device, wherein the session is established between the access terminal and a second network device, and wherein the functions further comprise
receiving data bound for the second network device, after the degradation of the session; and
saving the data until the session is reestablished on the access terminal.

43. The non-transitory computer readable storage medium of claim 36, wherein the network device comprises a first network device, the session is established between the access terminal and a second network device, and wherein the functions further comprise:
detecting the degradation of the session by detecting a state of the second network device.

44. The non-transitory computer readable storage medium of claim 43, wherein the state comprises a failure state.

45. The non-transitory computer readable storage medium of claim 36, wherein the functions further comprise:
retrieving a timer comprising a predefined period of time;
determining that the access terminal has failed to request to open a new session, after the predefined period of time has elapsed; and
deleting the minimum portion of the session information for the session.

* * * * *

UNITED STATES PATENT AND TRADEMARK OFFICE
CERTIFICATE OF CORRECTION

PATENT NO.         : 8,099,504 B2                                        Page 1 of 1
APPLICATION NO.    : 11/166893
DATED              : January 17, 2012
INVENTOR(S)        : Sanjay Cherian et al.

It is certified that error appears in the above-identified patent and that said Letters Patent is hereby corrected as shown below:

Column 19, Line 27, In Claim 17, delete "second" and insert -- session --, therefor.

Column 20, Line 8, In Claim 22, after "message;" insert -- and --.

Column 20, Line 26, In Claim 24, delete "Ix" and insert -- 1 x --, therefor.

Column 20, Line 33, In Claim 27, after "claim 22," insert -- wherein --.

Column 20, Line 54, In Claim 31, after "device" insert -- , and wherein the first network device --.

Column 20, Line 61, In Claim 32, after "session" insert -- ; --.

Column 22, Line 1, In Claim 39, after "The" insert -- non-transitory --.

Signed and Sealed this
Twenty-fourth Day of April, 2012

David J. Kappos
*Director of the United States Patent and Trademark Office*